US010027874B2

(12) United States Patent
Niida

(10) Patent No.: US 10,027,874 B2
(45) Date of Patent: Jul. 17, 2018

(54) IMAGING DEVICE, CLIENT DEVICE, IMAGING SYSTEM, CONTROL METHOD OF IMAGING DEVICE, CONTROL METHOD OF CLIENT DEVICE, AND CONTROL METHOD OF IMAGING SYSTEM

(71) Applicant: CANON KABUSHIKI KAISHA, Tokyo (JP)

(72) Inventor: Mitsuo Niida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/762,919

(22) PCT Filed: Jan. 20, 2014

(86) PCT No.: PCT/JP2014/000240
§ 371 (c)(1),
(2) Date: Jul. 23, 2015

(87) PCT Pub. No.: WO2014/115529
PCT Pub. Date: Jul. 31, 2014

(65) Prior Publication Data
US 2015/0358527 A1    Dec. 10, 2015

(30) Foreign Application Priority Data

Jan. 25, 2013  (JP) ................................ 2013-012311
Mar. 15, 2013  (JP) ................................ 2013-053595

(51) Int. Cl.
*H04N 5/225*  (2006.01)
*H04N 5/232*  (2006.01)
(Continued)

(52) U.S. Cl.
CPC ......... *H04N 5/23206* (2013.01); *G03B 11/00* (2013.01); *G03B 17/18* (2013.01);
(Continued)

(58) Field of Classification Search
CPC .................................................. H04N 5/23206
See application file for complete search history.

(56) References Cited

U.S. PATENT DOCUMENTS 8,159,533 B2 * 4/2012 Cheng .................... H04N 7/183
                                                          348/143
9,025,014 B2 * 5/2015 Brockway, III ..... H04L 12/2803
                                                          348/61
(Continued)

FOREIGN PATENT DOCUMENTS

CN          101013251 A      8/2007
CN          101119479 A      2/2008
(Continued)

OTHER PUBLICATIONS

Botuz, S.P., "Method for processing distributed measuring information in the network Internet/Intranet", Remote access control, 2006, pp. 187-195.

*Primary Examiner* — Gary C Vieaux
(74) *Attorney, Agent, or Firm* — Canon USA Inc., IP Division

(57) ABSTRACT

An imaging device that can be connected to a client device through a network includes an imaging optical system 2, an imaging element 6, an IRCF driving circuit 24 configured to insert/remove an IRCF 4 to/from an optical path of the imaging optical system 2, and a communication circuit 14 configured to receive an automatic insertion/removal control instruction for causing the imaging device to automatically control insertion/removal of the IRCF 4 and additional information relating to insertion/removal of the IRCF 4 from the client device and configured to transmit operation information indicative of whether the imaging device uses the additional information received by the communication circuit 14 in a case in which the IRCF 4 is inserted to the optical
(Continued)

path, in a case in which the IRCF 4 is removed from the optical path, or in both the cases of insertion and removal.

9 Claims, 18 Drawing Sheets

(51) Int. Cl.
    *G03B 11/00*     (2006.01)
    *H04N 5/238*     (2006.01)
    *H04N 5/33*     (2006.01)
    *G03B 17/18*     (2006.01)

(52) U.S. Cl.
    CPC ......... *H04N 5/238* (2013.01); *H04N 5/23216* (2013.01); *H04N 5/23293* (2013.01); *H04N 5/33* (2013.01)

(56) References Cited

U.S. PATENT DOCUMENTS

| | | | |
|---|---|---|---|
| 9,270,896 B2* | 2/2016 | Niida | H04N 5/2254 |
| 2005/0152287 A1 | 7/2005 | Yasushi et al. | |
| 2007/0002148 A1* | 1/2007 | Takahashi | H04N 5/2253 |
| | | | 348/219.1 |
| 2007/0257995 A1 | 11/2007 | Horowitz et al. | |
| 2009/0009655 A1* | 1/2009 | Suda | H04N 5/235 |
| | | | 348/360 |
| 2012/0013765 A1 | 1/2012 | Maruyama | |
| 2012/0051727 A1 | 3/2012 | Tanaka | |
| 2012/0307092 A1 | 12/2012 | Kotani | |
| 2016/0127627 A1* | 5/2016 | Niida | H04N 5/2254 |
| | | | 348/211.3 |

FOREIGN PATENT DOCUMENTS

| | | |
|---|---|---|
| CN | 101167346 A | 4/2008 |
| CN | 104322049 A | 1/2015 |
| JP | 7-107355 A | 4/1995 |
| JP | H11-039589 A | 2/1999 |
| JP | 2005-303766 A | 10/2005 |
| JP | 2006-005469 A | 1/2006 |
| JP | 2006-191418 A | 7/2006 |
| JP | 2007-306284 A | 11/2007 |
| JP | 2010-279061 A | 12/2010 |
| JP | 2012-047975 A | 3/2012 |
| JP | 2012-070336 A | 4/2012 |
| JP | 2012-119846 A | 6/2012 |
| RU | 2329533 C2 | 7/2008 |
| TW | 201143385 A | 12/2011 |

\* cited by examiner

[Fig. 1]

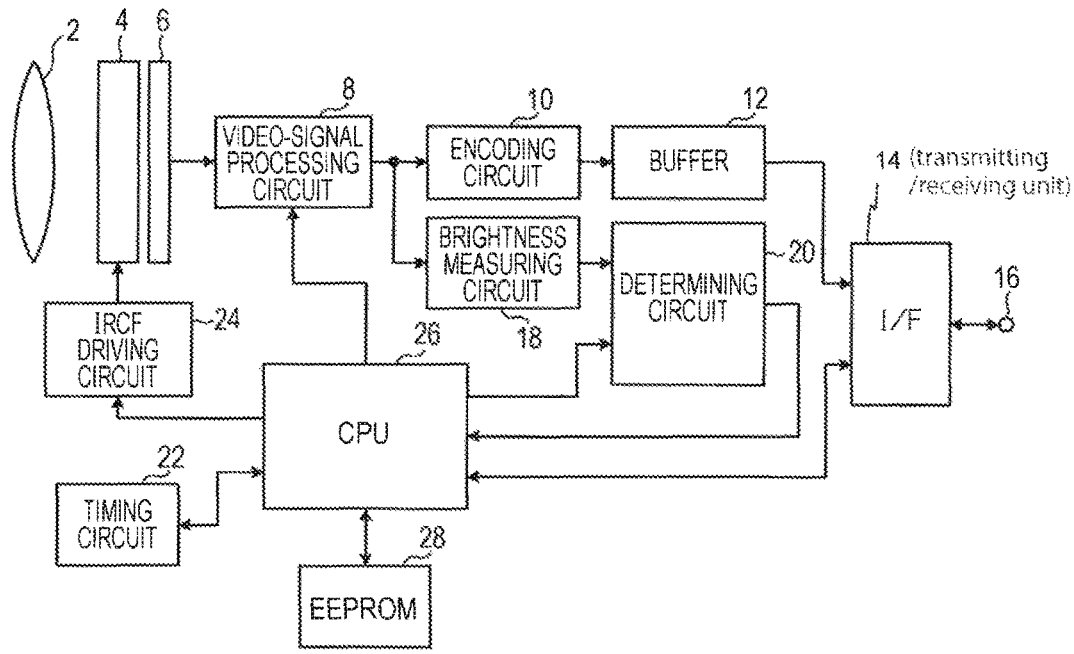

[Fig. 2A]

```
<xs:complexType name="ImagingSettings20">
    <xs:sequence>
        <xs:element name="Brightness" type="tt:FloatRange" minOccurs="0"/>
        <xs:element name="Contrast" type="tt:FloatRange" minOccurs="0"/>
        <xs:element name="IrCutFilterModes" type="tt:IrCutFilterMode" minOccurs="0" maxOccurs="unbounded"/>
        <xs:element name="Sharpness" type="tt:FloatRange" minOccurs="0"/>
        <xs:element name="WhiteBalance" type="tt:WhiteBalanceOptions20" minOccurs="0"/>
        .....
    </xs:sequence>
    <xs:anyAttribute processContents="lax"/>
</xs:complexType>
```

[Fig. 2B]

```
<xs:simpleType name="IrCutFilterMode">
    <xs:restriction base="xs:string">
        <xs:enumeration value="ON"/>
        <xs:enumeration value="OFF"/>
        <xs:enumeration value="AUTO"/>
    </xs:restriction>
</xs:simpleType>
```

[Fig. 2C]

```
<xs:element name="IrCutFilterAutoAdjustment" type="tt:IrCutFilterAutoAdjustment" minOccurs="0" maxOccurs="2" />
```

[Fig. 2D]

```
<xs:complexType name="IrCutFilterAutoAdjustment">
    <xs:sequence>
        <xs:element name="BoundaryType" type="tt:IrCutFilterAutoBoundaryType" />
        <xs:element name="BoundaryOffset" type="xs:float" minOccurs="0" />
        <xs:element name="ResponseTime" type="xs:duration" minOccurs="0" />
    </xs:sequence>
</xs:complexType>
```

[Fig. 2E]

```
<xs:simpleType name="IrCutFilterAutoBoundaryType">
    <xs:restriction base="xs:string">
        <xs:enumeration value="Common"/>
        <xs:enumeration value="ToOn"/>
        <xs:enumeration value="ToOff"/>
        <xs:enumeration value="Extended"/>
    </xs:restriction>
</xs:simpleType>
```

[Fig. 3A]

```
<s:Body
  xmlns:xsi="http://www.w3.org/2001/XMLSchema-instance"
  xmlns:xsd="http://www.w3.org/2001/XMLSchema">
    <SetImagingSettings xmlns="http://www.onvif.org/ver20/imaging/wsdl">
        <VideoSourceToken>0</VideoSourceToken>
        <ImagingSettings>
            <IrCutFilter xmlns="http://www.onvif.org/ver10/schema">
AUTO
            </IrCutFilter>
            <IrCutFilterAutoAdjustment>
                <BoundaryType>ToOff</BoundaryType>
                <BoundaryOffset>-0.52</BoundaryOffset>
                <ResponseTime>PT1M30S</ResponseTime>
            </IrCutFilterAutoAdjustment>
        </ImagingSettings>
        <ForcePersistence>false</ForcePersistence>
    </SetImagingSettings>
</s:Body>
```

[Fig. 3B]

```xml
<s:Body
  xmlns:xsi="http://www.w3.org/2001/XMLSchema-instance"
  xmlns:xsd="http://www.w3.org/2001/XMLSchema">
    <SetImagingSettings xmlns="http://www.onvif.org/ver20/imaging/wsdl">
        <VideoSourceToken>0</VideoSourceToken>
        <ImagingSettings>
            <IrCutFilter xmlns="http://www.onvif.org/ver10/schema">
            AUTO
            </IrCutFilter>
            <IrCutFilterAutoAdjustment>
                <BoundaryType>ToOn</BoundaryType>
                <BoundaryOffset>0.65</BoundaryOffset>
            </IrCutFilterAutoAdjustment>
        </ImagingSettings>
        <ForcePersistence>false</ForcePersistence>
    </SetImagingSettings>
</s:Body>
```

[Fig. 3C]

```xml
<s:Body
  xmlns:xsi="http://www.w3.org/2001/XMLSchema-instance"
  xmlns:xsd="http://www.w3.org/2001/XMLSchema">
    <SetImagingSettings xmlns="http://www.onvif.org/ver20/imaging/wsdl">
        <VideoSourceToken>0</VideoSourceToken>
        <ImagingSettings>
            <IrCutFilter xmlns="http://www.onvif.org/ver10/schema">
            AUTO
            </IrCutFilter>
            <IrCutFilterAutoAdjustment>
                <BoundaryType>Common</BoundaryType>
                <BoundaryOffset>0.52</BoundaryOffset>
                <ResponseTime>PT1M15S</ResponseTime>
            </IrCutFilterAutoAdjustment>
        </ImagingSettings>
        <ForcePersistence>false</ForcePersistence>
    </SetImagingSettings>
</s:Body>
```

[Fig. 3D]

```
<s:Body
 xmlns:xsi="http://www.w3.org/2001/XMLSchema-instance"
 xmlns:xsd="http://www.w3.org/2001/XMLSchema">
        <SetImagingSettings xmlns="http://www.onvif.org/ver20/imaging/wsdl">
                <VideoSourceToken>0</VideoSourceToken>
                <ImagingSettings>
                        <IrCutFilter xmlns="http://www.onvif.org/ver10/schema">
                        AUTO
                        </IrCutFilter>
                </ImagingSettings>
                <ForcePersistence>false</ForcePersistence>
        </SetImagingSettings>
</s:Body>
```

[Fig. 3E]

```
<s:Body
 xmlns:xsi="http://www.w3.org/2001/XMLSchema-instance"
 xmlns:xsd="http://www.w3.org/2001/XMLSchema">
        <SetImagingSettings xmlns="http://www.onvif.org/ver20/imaging/wsdl">
                <VideoSourceToken>0</VideoSourceToken>
                <ImagingSettings>
                        <IrCutFilter xmlns="http://www.onvif.org/ver10/schema">
                        ON
                        </IrCutFilter>
                </ImagingSettings>
                <ForcePersistence>false</ForcePersistence>
        </SetImagingSettings>
</s:Body>
```

[Fig. 3F]

```
<s:Body
 xmlns:xsi="http://www.w3.org/2001/XMLSchema-instance"
 xmlns:xsd="http://www.w3.org/2001/XMLSchema">
        <SetImagingSettings xmlns="http://www.onvif.org/ver20/imaging/wsdl">
                <VideoSourceToken>0</VideoSourceToken>
                <ImagingSettings>
                        <IrCutFilter xmlns="http://www.onvif.org/ver10/schema">
                        OFF
                        </IrCutFilter>
                </ImagingSettings>
                <ForcePersistence>false</ForcePersistence>
        </SetImagingSettings>
</s:Body>
```

[Fig. 4]
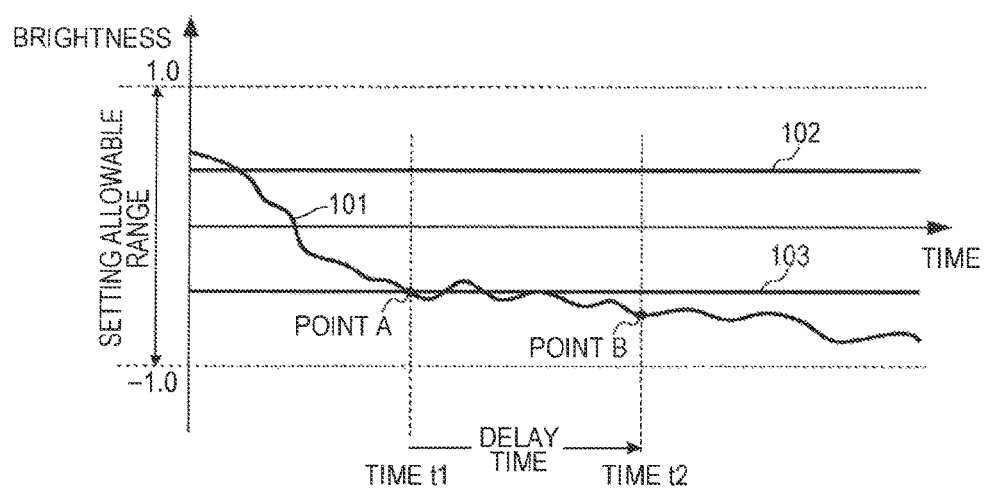

[Fig. 5]
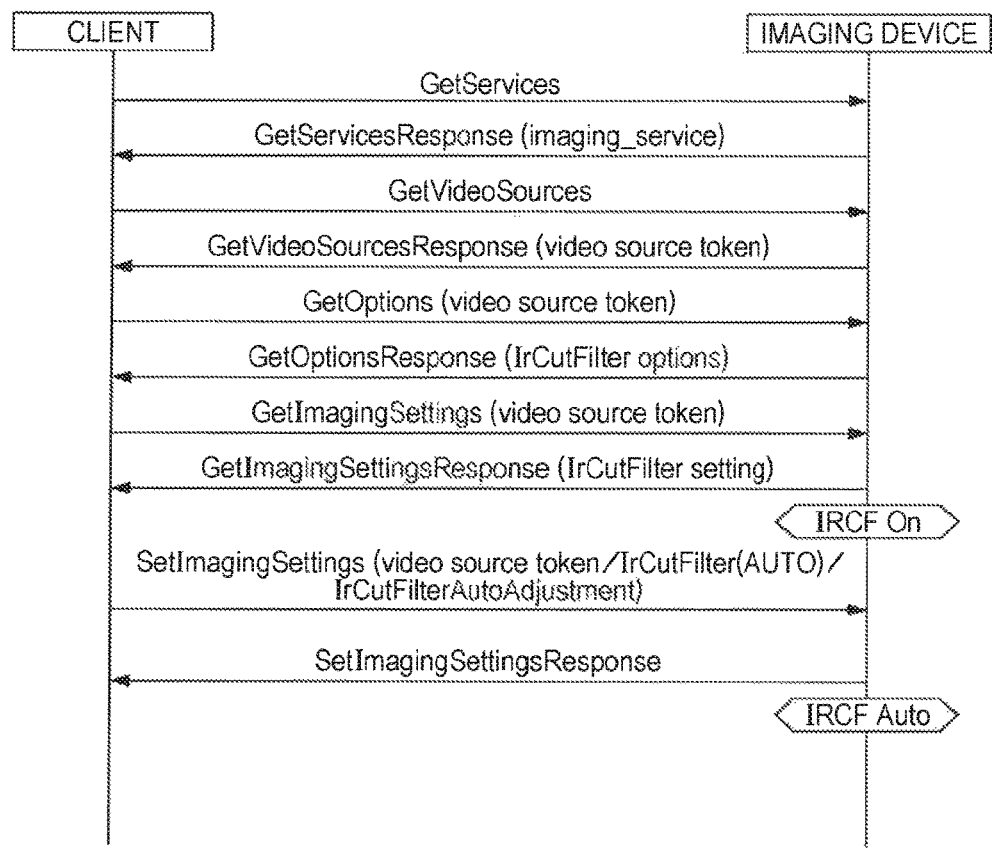

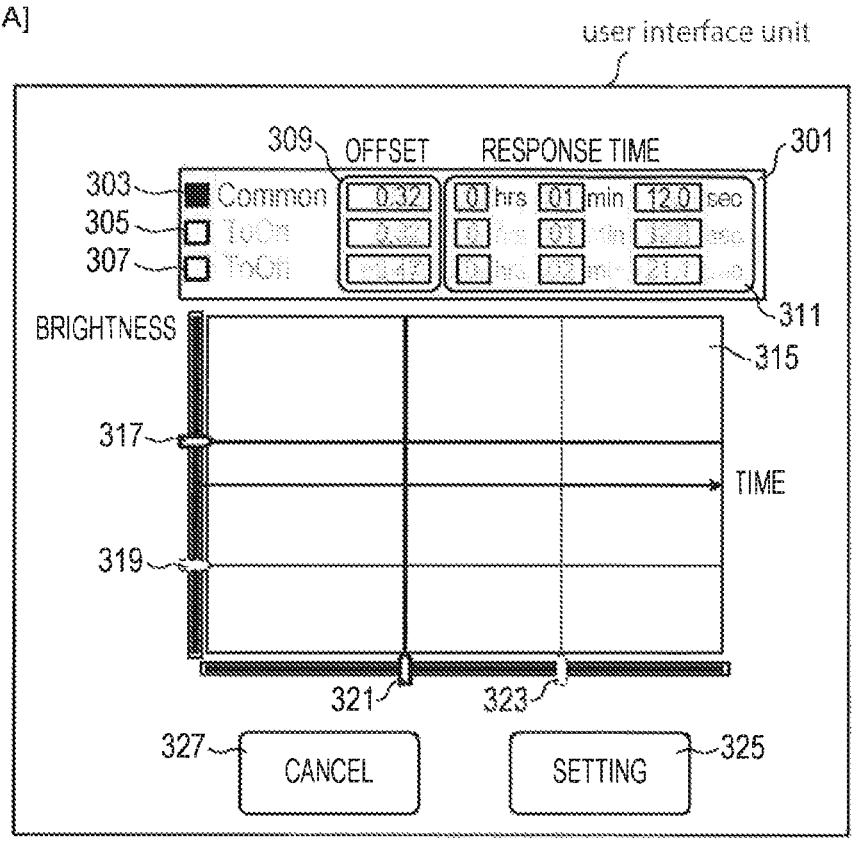
[Fig. 6A]

[Fig. 6B]
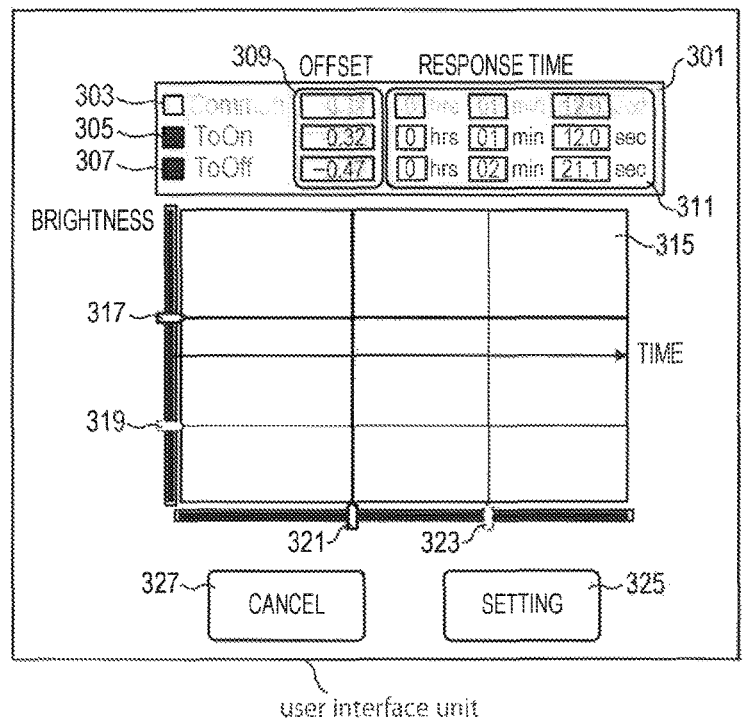
[Fig. 7]
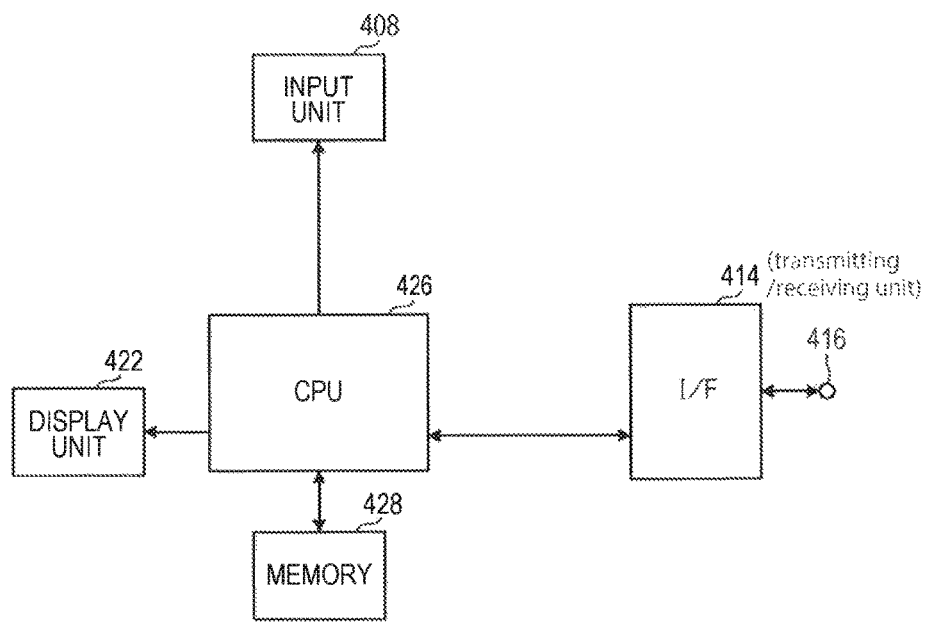

[Fig. 9A]

```
<s:Body
xmlns:xsi="http://www.w3.org/2001/XMLSchema-instance"
xmlns:xsd="http://www.w3.org/2001/XMLSchema">
    <SetImagingSettings xmlns="http://www.onvif.org/ver20/imaging/wsdl">
        <VideoSourceToken>0</VideoSourceToken>
        <ImagingSettings>
            <IrCutFilter xmlns="http://www.onvif.org/ver10/schema">
            AUTO
            </IrCutFilter>
            <IrCutFilterAutoAdjustment>
                <BoundaryType>ToOff</BoundaryType>
                <BoundaryOffset>-0.52</BoundaryOffset>
                <ResponseTime>PT1M30S</ResponseTime>
            </IrCutFilterAutoAdjustment>
        </ImagingSettings>
        <ForcePersistence>false</ForcePersistence>
    </SetImagingSettings>
</s:Body>
```

[Fig. 9B]

```
<s:Body
xmlns:xsi="http://www.w3.org/2001/XMLSchema-instance"
xmlns:xsd="http://www.w3.org/2001/XMLSchema">
    <SetImagingSettings xmlns="http://www.onvif.org/ver20/imaging/wsdl">
        <VideoSourceToken>0</VideoSourceToken>
        <ImagingSettings>
            <IrCutFilter xmlns="http://www.onvif.org/ver10/schema">
            AUTO
            </IrCutFilter>
            <IrCutFilterAutoAdjustment>
                <BoundaryType>ToOn</BoundaryType>
                <BoundaryOffset>0.65</BoundaryOffset>
                <ResponseTime>PT1M10S</ResponseTime>
            </IrCutFilterAutoAdjustment>
        </ImagingSettings>
        <ForcePersistence>false</ForcePersistence>
    </SetImagingSettings>
</s:Body>
```

[Fig. 9C]

```
<s:Body
    xmlns:xsi="http://www.w3.org/2001/XMLSchema-instance"
    xmlns:xsd="http://www.w3.org/2001/XMLSchema">
        <SetImagingSettings xmlns="http://www.onvif.org/ver20/imaging/wsdl">
            <VideoSourceToken>0</VideoSourceToken>
            <ImagingSettings>
                <IrCutFilter xmlns="http://www.onvif.org/ver10/schema">
                    AUTO
                </IrCutFilter>
                <IrCutFilterAutoAdjustment>
                    <BoundaryType>Common</BoundaryType>
                    <BoundaryOffset>0.52</BoundaryOffset>
                    <ResponseTime>PT1M15S</ResponseTime>
                </IrCutFilterAutoAdjustment>
            </ImagingSettings>
            <ForcePersistence>false</ForcePersistence>
        </SetImagingSettings>
</s:Body>
```

[Fig. 9D]

```
<s:Body
    xmlns:xsi="http://www.w3.org/2001/XMLSchema-instance"
    xmlns:xsd="http://www.w3.org/2001/XMLSchema">
        <SetImagingSettings xmlns="http://www.onvif.org/ver20/imaging/wsdl">
            <VideoSourceToken>0</VideoSourceToken>
            <ImagingSettings>
                <IrCutFilter xmlns="http://www.onvif.org/ver10/schema">
                    AUTO
                </IrCutFilter>
            </ImagingSettings>
            <ForcePersistence>false</ForcePersistence>
        </SetImagingSettings>
</s:Body>
```

[Fig. 9E]

```
<s:Body
xmlns:xsi="http://www.w3.org/2001/XMLSchema-instance"
xmlns:xsd="http://www.w3.org/2001/XMLSchema">
    <SetImagingSettings xmlns="http://www.onvif.org/ver20/imaging/wsdl">
        <VideoSourceToken>0</VideoSourceToken>
        <ImagingSettings>
            <IrCutFilter xmlns="http://www.onvif.org/ver10/schema">
            ON
            </IrCutFilter>
        </ImagingSettings>
        <ForcePersistence>false</ForcePersistence>
    </SetImagingSettings>
</s:Body>
```

[Fig. 9F]

```
<s:Body
xmlns:xsi="http://www.w3.org/2001/XMLSchema-instance"
xmlns:xsd="http://www.w3.org/2001/XMLSchema">
    <SetImagingSettings xmlns="http://www.onvif.org/ver20/imaging/wsdl">
        <VideoSourceToken>0</VideoSourceToken>
        <ImagingSettings>
            <IrCutFilter xmlns="http://www.onvif.org/ver10/schema">
            OFF
            </IrCutFilter>
        </ImagingSettings>
        <ForcePersistence>false</ForcePersistence>
    </SetImagingSettings>
</s:Body>
```

[Fig. 9G]

```xml
<s:Body
xmlns:xsi="http://www.w3.org/2001/XMLSchema-instance"
xmlns:xsd="http://www.w3.org/2001/XMLSchema">
    <SetImagingSettings xmlns="http://www.onvif.org/ver20/imaging/wsdl">
        <VideoSourceToken>0</VideoSourceToken>
        <ImagingSettings>
            <IrCutFilter xmlns="http://www.onvif.org/ver10/schema">
            AUTO
            </IrCutFilter>
            <IrCutFilterAutoAdjustment>
                <BoundaryType>ToOn</BoundaryType>
                <BoundaryOffset>0.16</BoundaryOffset>
                <ResponseTime>PT1M30S</ResponseTime>
            </IrCutFilterAutoAdjustment>
            <IrCutFilterAutoAdjustment>
                <BoundaryType>ToOff</BoundaryType>
                <BoundaryOffset>-0.62</BoundaryOffset>
                <ResponseTime>PT1M10S</ResponseTime>
            </IrCutFilterAutoAdjustment>
        </ImagingSettings>
        <ForcePersistence>false</ForcePersistence>
    </SetImagingSettings>
</s:Body>
```

[Fig. 10A]

```xml
<s:Body
xmlns:xsi="http://www.w3.org/2001/XMLSchema-instance"
xmlns:xsd="http://www.w3.org/2001/XMLSchema">
    <GetOptions xmlns="http://www.onvif.org/ver20/imaging/wsdl">
        <VideoSourceToken>0</VideoSourceToken>
    </GetOptions>
</s:Body>
```

[Fig. 10B]

```
<s:Body
xmlns:xsi="http://www.w3.org/2001/XMLSchema-instance"
xmlns:xsd="http://www.w3.org/2001/XMLSchema">
xmlns:img20="http://www.onvif.org/ver20/schema">
        <GetOptionsResponse xmlns="http://www.onvif.org/ver20/imaging/wsdl">
                <ImagingOptions20>
                        <img20:IrCutFilterModes>ON</img20:IrCutFilterModes>
                        <img20:IrCutFilterModes>OFF</img20:IrCutFilterModes>
                        <img20:IrCutFilterModes>AUTO</img20:IrCutFilterModes>
                </ImagingOptions20>
                <ImagingOptions20Extention>
                <ImagingOptions20Extention2>
                        <IrCutFilterAutoAdjustmentOptions>
                                <img20:Modes>Common</img20:Mode>
                                <img20:BoundaryOffset>true</img20:BoundaryOffset>
                                <img20:ResponseTime>
                                        <img20:Min>PT0S</img20:Min>
                                        <img20:Max>PT30M</img20:Max>
                                </img20:ResponseTime>
                        </IrCutFilterAutoAdjustment>
                </ImagingOptions20Extention>
                </ImagingOptions20Extention2>
        </GetOptionsResponse>
</s:Body>
```

[Fig. 10C]

```xml
<s:Body
    xmlns:xsi="http://www.w3.org/2001/XMLSchema-instance"
    xmlns:xsd="http://www.w3.org/2001/XMLSchema">
    xmlns:img20="http://www.onvif.org/ver20/schema">
    <GetOptionsResponse xmlns="http://www.onvif.org/ver20/imaging/wsdl">
        <ImagingOptions20>
            ......
            <img20:IrCutFilterModes>ON</img20:IrCutFilterModes>
            <img20:IrCutFilterModes>OFF</img20:IrCutFilterModes>
            <img20:IrCutFilterModes>AUTO</img20:IrCutFilterModes>
            ......
        </ImagingOptions20>
        <ImagingOptions20Extention>
            ......
        <ImagingOptions20Extention2>
            <IrCutFilterAutoAdjustmentOptions>
                <img20:Modes>ToOn</img20:Mode>
                <img20:Modes>ToOff</img20:Mode>
                <img20:BoundaryOffset>true</img20:BoundaryOffset>
                <img20:ResponseTime>
                    <img20:Min>PT0S</img20:Min>
                    <img20:Max>PT30M</img20:Max>
                </img20:ResponseTime>
            </IrCutFilterAutoAdjustment>
        </ImagingOptions20Extention>
        ......
        </ImagingOptions20Extention2>
    </GetOptionsResponse>
</s:Body>
```

[Fig. 11]
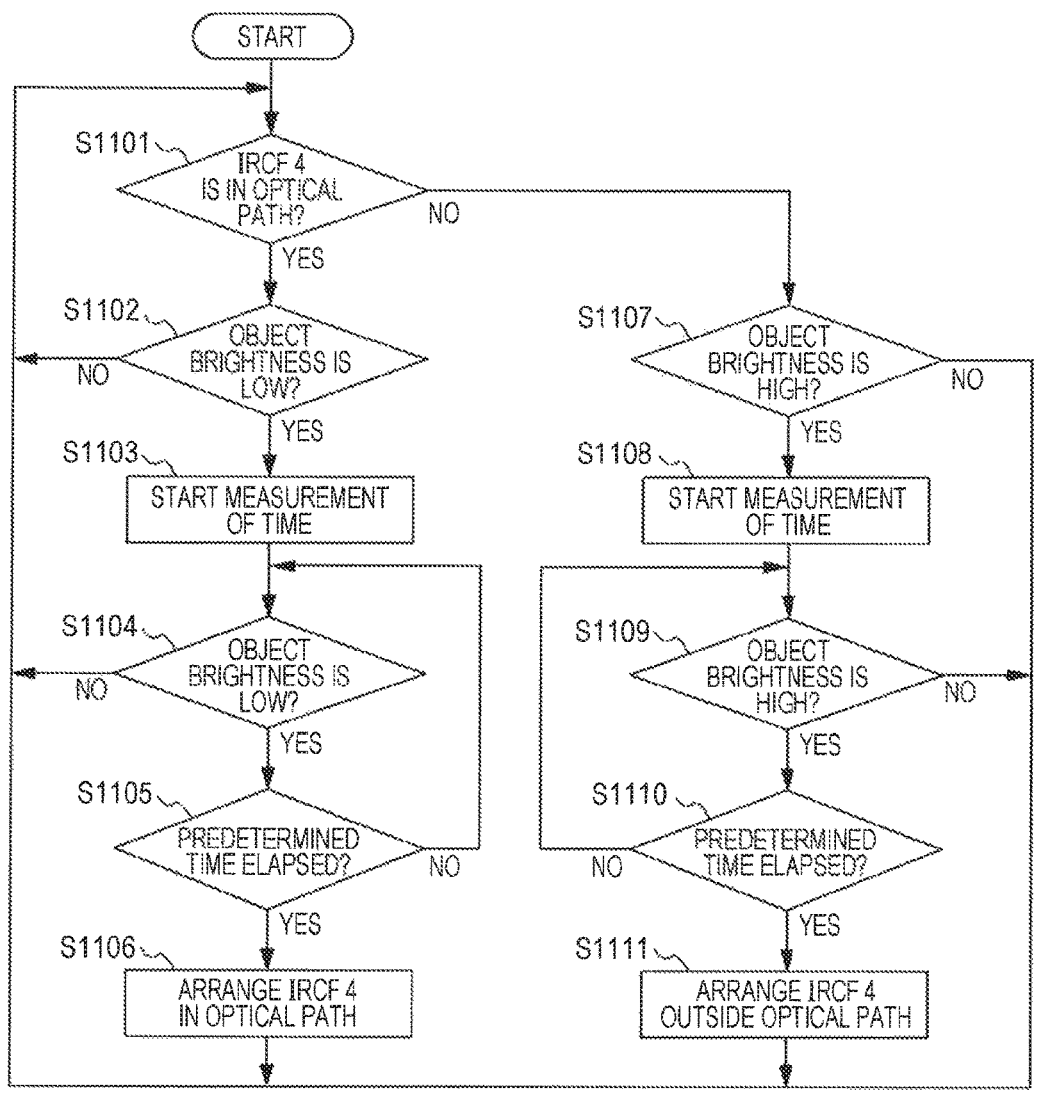

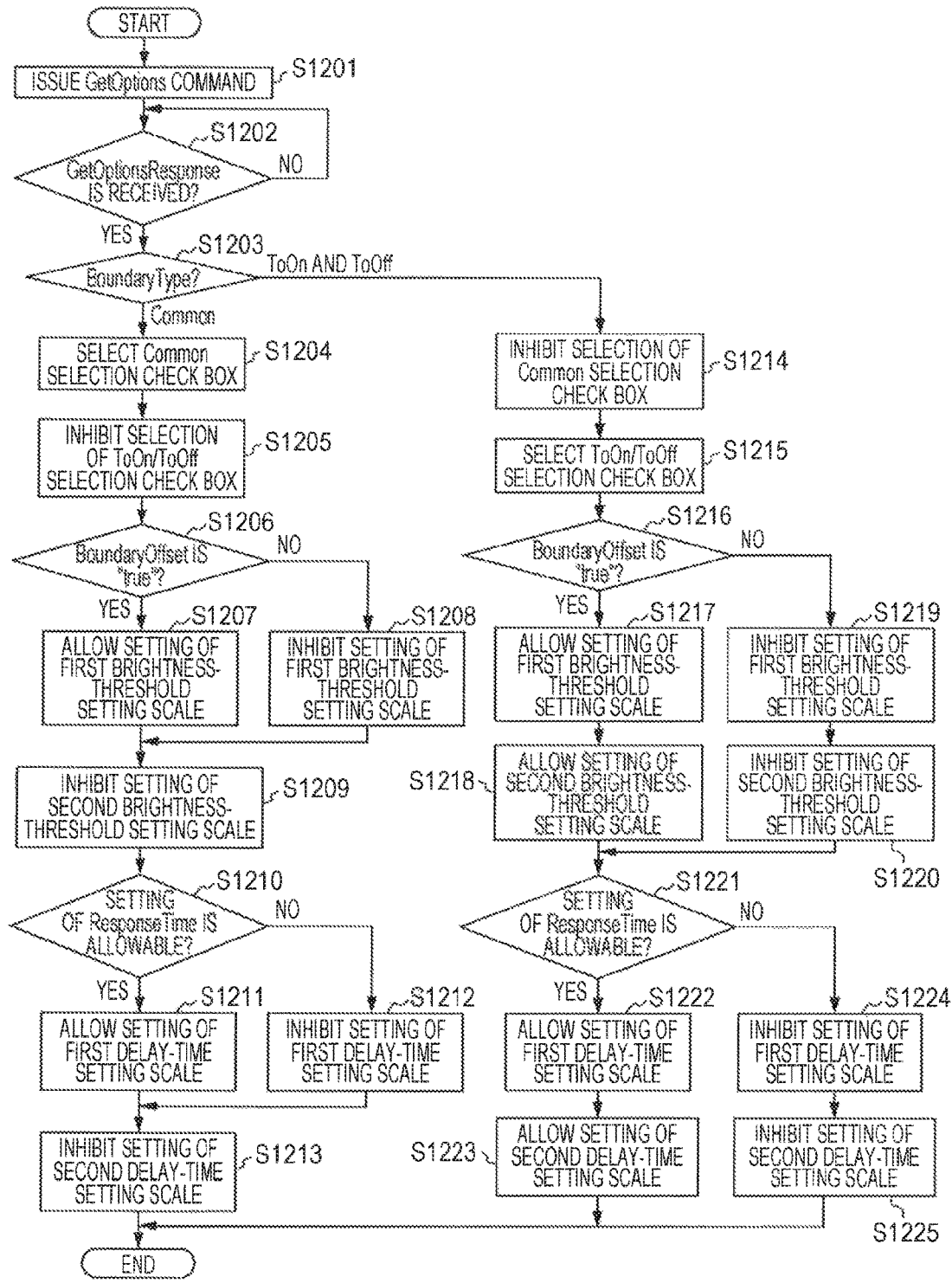
[Fig. 12]

[Fig. 13]
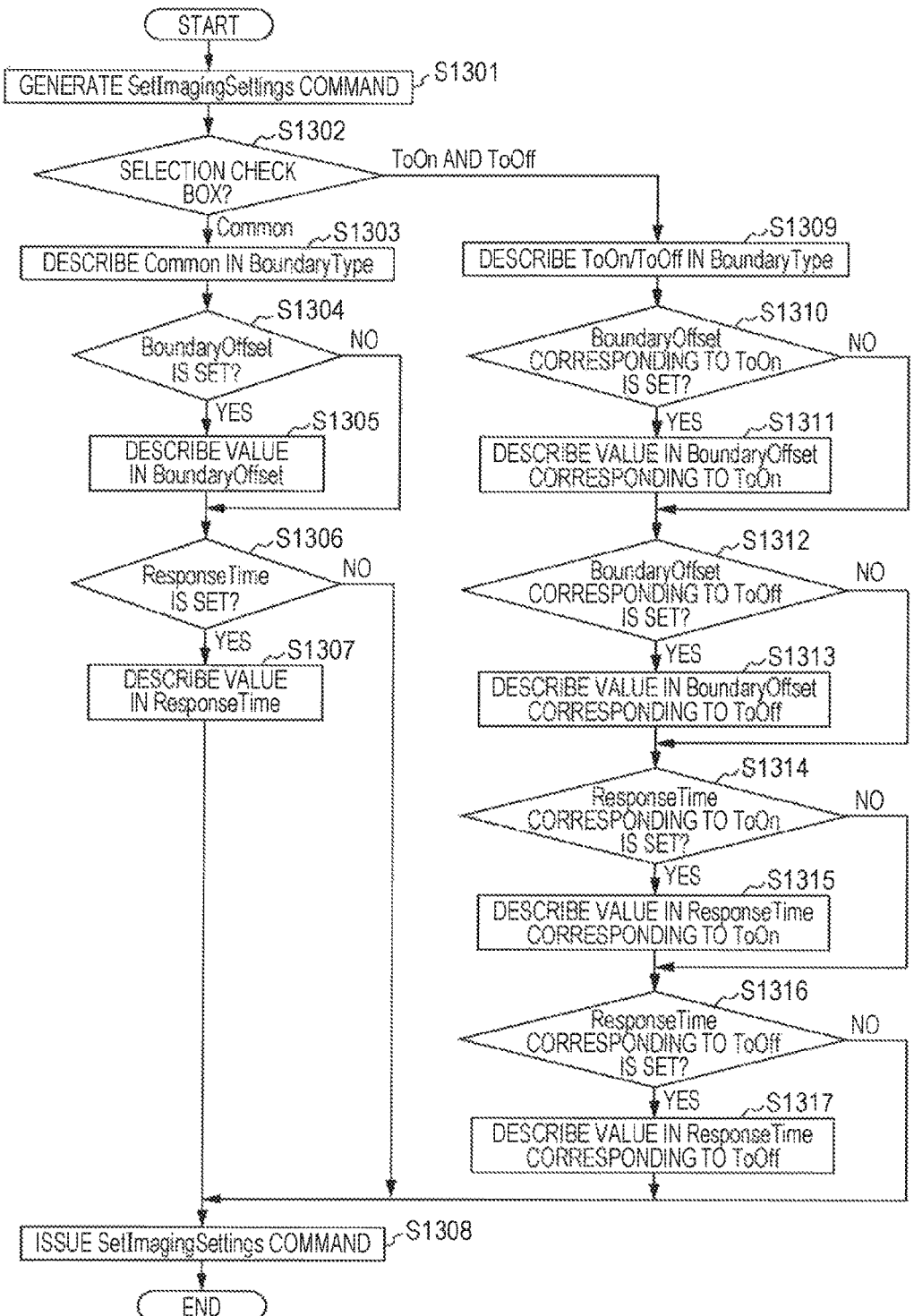

IMAGING DEVICE, CLIENT DEVICE, IMAGING SYSTEM, CONTROL METHOD OF IMAGING DEVICE, CONTROL METHOD OF CLIENT DEVICE, AND CONTROL METHOD OF IMAGING SYSTEM

TECHNICAL FIELD

The present invention relates to an imaging device that inserts/removes an infrared cut filter to/from an optical path of an imaging optical system, a client device being connectable to the imaging device through a network, and an imaging system including the imaging device and the client device. Also, the present invention relates to a control method of the imaging device, a control method of the client device, and a control method of the imaging system.

BACKGROUND ART

There has been known an imaging device that can insert/remove an infrared cut filter to/from an optical path of an imaging optical system, and perform imaging with visible light (visible-light imaging) and imaging with infrared radiation (infrared imaging).

This imaging device normally performs visible-light imaging if the infrared cut filter is inserted to the optical path of the imaging optical system, and performs infrared imaging if the infrared cut filter is removed from the optical path. Also, this imaging device determines the brightness of the external environment of the device, and controls insertion/removal of the infrared cut filter to/from the optical path of the imaging optical system. (PTL 1)

Also, since network technologies are rapidly spread, user needs are grown to control the imaging device through the network from an external control device by using a network interface mounted on the imaging device. The needs also include insertion/removal control of the infrared cut filter to/from the optical path of the imaging optical system. There have been user requests for allowing the imaging device to be set through the network to automatically control insertion/removal of the infrared cut filter to/from the optical path of the imaging optical system.

CITATION LIST

Patent Literature

PTL 1: Japanese Patent Laid-Open No. 7-107355

SUMMARY OF INVENTION

Technical Problem

However, in the related art, the imaging device cannot be controlled to automatically insert/remove the infrared cut filter, by the external client device through the network.

Also, for the setting to cause the imaging device to automatically control insertion/removal of the infrared cut filter, there may be considered user needs for additionally setting the brightness level of the external environment and the delay time relating to insertion/removal of the infrared cut filter.

However, in this case, when the automatic control for insertion/removal of the infrared cut filter is set, the user has to set the automatic control with regard to the brightness level of the external environment and the delay time relating to insertion/removal of the infrared cut filter, as additional information. Owing to this, user's operation may become troublesome.

For example, the user who operates the client device hardly understands how the additional information such as the brightness level of the external environment and the delay time relating to insertion/removal of the infrared cut filter is used. Hence user's operation may become troublesome.

The present invention is made in light of the situations. That is, the invention provides a client device that is connected to an imaging device through a network, recognizes a case in which the imaging device uses additional information relating to insertion/removal of an infrared cut filter, and increases operability of a user.

Also, the invention provides an imaging device that is connected to a client device through a network, causes the client device to recognize a case in which the imaging device uses additional information relating to insertion/removal of an infrared cut filter, and increases operability of a user.

Also, the invention provides an imaging system that causes a client device, which is connected to an imaging device through a network, to recognize a case in which the imaging device uses additional information relating to insertion/removal of an infrared cut filter, and increases operability of a user.

Solution to Problem

According to an aspect of the invention, there is provided a client device that can make communication with an imaging device through a network, the imaging device including an imaging optical system, an imaging unit configured to take an image of an object formed by the imaging optical system, an infrared cut filter configured to cut infrared radiation, an inserting/removing unit configured to insert/remove the infrared cut filter to/from an optical path of the imaging optical system, and a control unit configured to control the inserting/removing unit based on adjustment information relating to insertion/removal of the infrared cut filter. The client device includes a receiving unit configured to receive insertion/removal specification information relating to the adjustment information from the imaging device through the network; and a user interface unit configured to allow a user to specify the adjustment information based on the insertion/removal specification information received by the receiving unit. The insertion/removal specification information indicates whether different pieces of the adjustment information, which is used by the control unit, can be individually specified, or the adjustment information can be commonly specified, for a case in which the infrared cut filter is inserted to the optical path and a case in which the infrared cut filter is removed from the optical path.

According to another aspect of the invention, there is provided an imaging device that can make communication with a client device through a network, the client device including a user interface unit configured to cause a user to specify information. The imaging device includes an imaging optical system; an imaging unit configured to take an image of an object formed by the imaging optical system; an infrared cut filter configured to cut infrared radiation; an inserting/removing unit configured to insert/remove the infrared cut filter to/from an optical path of the imaging optical system; a control unit configured to control the inserting/removing unit based on adjustment information relating to insertion/removal of the infrared cut filter; and a transmitting unit configured to transmit insertion/removal specification information necessary for causing the user interface unit to specify the adjustment information, to the client device through the network. The insertion/removal specification information indicates whether different pieces of the adjustment information, which is used by the control unit, can be individually specified, or the adjustment information can be commonly specified, for a case in which the infrared cut filter is inserted to the optical path and a case in which the infrared cut filter is removed from the optical path.

According to still another aspect of the invention, there is provided an imaging system including an imaging device; and a client device that can make communication with the imaging device through a network. The imaging device includes an imaging optical system, an imaging unit configured to take an image of an object formed by the imaging optical system, an infrared cut filter configured to cut infrared radiation, an inserting/removing unit configured to insert/remove the infrared cut filter to/from an optical path of the imaging optical system, and a control unit configured to control the inserting/removing unit based on adjustment information relating to insertion/removal of the infrared cut filter. The client device includes a receiving unit configured to receive insertion/removal specification information relating to the adjustment information from the imaging device through the network, and a user interface unit configured to allow a user to specify the adjustment information based on the insertion/removal specification information received by the receiving unit. The insertion/removal specification information indicates whether different pieces of the adjustment information, which is used by the control unit, can be individually specified, or the adjustment information can be commonly specified, for a case in which the infrared cut filter is inserted to the optical path and a case in which the infrared cut filter is removed from the optical path.

According to yet another aspect of the invention, there is provided a control method of a client device that can make communication with an imaging device through a network, the imaging device including an imaging optical system, an imaging unit configured to take an image of an object formed by the imaging optical system, an infrared cut filter configured to cut infrared radiation, an inserting/removing unit configured to insert/remove the infrared cut filter to/from an optical path of the imaging optical system, and a control unit configured to control the inserting/removing unit based on adjustment information relating to insertion/removal of the infrared cut filter. The control method of the client device includes a receiving step of receiving insertion/removal specification information relating to the adjustment information from the imaging device through the network, and a user interface step of allowing a user to specify the adjustment information based on the insertion/removal specification information received in the receiving step. The insertion/removal specification information indicates whether different pieces of the adjustment information, which is used by the control unit, can be individually specified, or the adjustment information can be commonly specified, for a case in which the infrared cut filter is inserted to the optical path and a case in which the infrared cut filter is removed from the optical path.

According to a further aspect of the invention, there is provided a control method of an imaging device, the imaging device being able to make communication with a client device through a network, the client device including a user interface unit configured to cause a user to specify information, the imaging device including an imaging optical system, an imaging unit configured to take an image of an object formed by the imaging optical system, an infrared cut filter configured to cut infrared radiation, and an inserting/removing unit configured to insert/remove the infrared cut filter to/from an optical path of the imaging optical system. The control method of the imaging device includes a control step of controlling the inserting/removing unit based on adjustment information relating to insertion/removal of the infrared cut filter; and a transmitting step of transmitting insertion/removal specification information necessary for causing the user interface unit to specify the adjustment information, to the client device through the network. The insertion/removal specification information indicates whether different pieces of the adjustment information, which is used in the control step, can be individually specified, or the adjustment information can be commonly specified, for a case in which the infrared cut filter is inserted to the optical path and a case in which the infrared cut filter is removed from the optical path.

According to a still further aspect of the invention, there is provided a control method of an imaging system, the imaging system including an imaging device, and a client device that can make communication with the imaging device through a network, the imaging device including an imaging optical system, an imaging unit configured to take an image of an object formed by the imaging optical system, an infrared cut filter configured to cut infrared radiation, an inserting/removing unit configured to insert/remove the infrared cut filter to/from an optical path of the imaging optical system. The control method of the imaging system includes, by the imaging device, a control step of controlling the inserting/removing unit based on adjustment information relating to insertion/removal of the infrared cut filter; and, by the client device, a receiving step of receiving insertion/removal specification information relating to the adjustment information from the imaging device through the network; and a user interface step of allowing a user to specify the adjustment information based on the insertion/removal specification information received in the receiving step. The insertion/removal specification information indicates whether different pieces of the adjustment information, which is used in the control step, can be individually specified, or the adjustment information can be commonly specified, for a case in which the infrared cut filter is inserted to the optical path and a case in which the infrared cut filter is removed from the optical path.

According to a yet further aspect of the invention, there is provided a program for controlling a client device that can make communication with an imaging device through a network, the imaging device including an imaging optical system, an imaging unit configured to take an image of an object formed by the imaging optical system, an infrared cut filter configured to cut infrared radiation, an inserting/removing unit configured to insert/remove the infrared cut filter to/from an optical path of the imaging optical system, and a control unit configured to control the inserting/removing unit based on adjustment information relating to insertion/removal of the infrared cut filter, the program for controlling the client device causing a computer to execute a process. The process includes a receiving step of receiving insertion/removal specification information relating to the adjustment information from the imaging device through the network; and a user interface step of allowing a user to specify the adjustment information based on the insertion/removal specification information received in the receiving step. The insertion/removal specification information indicates whether different pieces of the adjustment information, which is used by the control unit, can be individually specified, or the adjustment information can be commonly specified, for a case in which the infrared cut filter is inserted to the optical path and a case in which the infrared cut filter is removed from the optical path.

According to a yet further aspect of the invention, there is provided a program for controlling an imaging device, the imaging device being able to make communication with a client device through a network, the client device including a user interface unit configured to cause a user to specify information, the imaging device including an imaging optical system, an imaging unit configured to take an image of an object formed by the imaging optical system, an infrared cut filter configured to cut infrared radiation, and an inserting/removing unit configured to insert/remove the infrared cut filter to/from an optical path of the imaging optical system, the program for controlling the imaging device causing a computer to execute a process. The process includes a control step of controlling the inserting/removing unit based on adjustment information relating to insertion/removal of the infrared cut filter; and a transmitting step of transmitting insertion/removal specification information necessary for causing the user interface unit to specify the adjustment information, to the client device through the network. The insertion/removal specification information indicates whether different pieces of the adjustment information, which is used in the control step, can be individually specified, or the adjustment information can be commonly specified, for a case in which the infrared cut filter is inserted to the optical path and a case in which the infrared cut filter is removed from the optical path.

According to a yet further aspect of the invention, there is provided a program for controlling an imaging system, the imaging system including an imaging device, and a client device that can make communication with the imaging device through a network, the imaging device including an imaging optical system, an imaging unit configured to take an image of an object formed by the imaging optical system, an infrared cut filter configured to cut infrared radiation, an inserting/removing unit configured to insert/remove the infrared cut filter to/from an optical path of the imaging optical system, the program for controlling the imaging system causing a computer to execute a process. The process includes, by the imaging device, a control step of controlling the inserting/removing unit based on adjustment information relating to insertion/removal of the infrared cut filter; and, by the client device, a receiving step of receiving insertion/removal specification information relating to the adjustment information from the imaging device through the network; and a user interface step of allowing a user to specify the adjustment information based on the insertion/removal specification information received in the receiving step. The insertion/removal specification information indicates whether different pieces of the adjustment information, which is used in the control step, can be individually specified, or the adjustment information can be commonly specified, for a case in which the infrared cut filter is inserted to the optical path and a case in which the infrared cut filter is removed from the optical path.

According to a yet further aspect of the invention, there is provided an imaging device that can make communication with a client device through a network, the client device including a user interface unit configured to cause a user to specify information. The imaging device includes an imaging optical system; an imaging unit configured to take an image of an object formed by the imaging optical system; an infrared cut filter configured to cut infrared radiation; a changing unit configured to change an imaging mode of the imaging device between a monochrome mode and a color mode based on adjustment information relating to insertion/removal of the infrared cut filter to/from an optical path of the imaging optical system; and a transmitting unit configured to transmit insertion/removal specification information necessary for causing the user interface unit to specify the adjustment information, to the client device through the network. The insertion/removal specification information indicates whether different pieces of the adjustment information, which is used by the changing unit, can be individually specified, or the adjustment information can be commonly specified, for a case in which the infrared cut filter is inserted to the optical path and a case in which the infrared cut filter is removed from the optical path.

According to a yet further aspect of the invention, there is provided an imaging device that can make communication with a client device through a network, the client device including a user interface unit configured to cause a user to specify information. The imaging device includes an imaging optical system; an imaging unit configured to take an image of an object formed by the imaging optical system; an infrared cut filter configured to cut infrared radiation; an image processing unit configured to perform image processing to increase a brightness of a video signal output from the imaging unit, based on adjustment information relating to insertion/removal of the infrared cut filter to/from an optical path of the imaging optical system; and a transmitting unit configured to transmit insertion/removal specification information necessary for causing the user interface unit to specify the adjustment information, to the client device through the network. The insertion/removal specification information indicates whether different pieces of the adjustment information, which is used by the image processing unit, can be individually specified, or the adjustment information can be commonly specified, for a case in which the infrared cut filter is inserted to the optical path and a case in which the infrared cut filter is removed from the optical path.

According to a yet further aspect of the invention, there is provided an imaging device that can make communication with a client device through a network, the client device including a user interface unit configured to cause a user to specify information. The imaging device includes an imaging optical system; an imaging unit configured to take an image of an object formed by the imaging optical system; an infrared cut filter configured to cut infrared radiation; a control unit configured to control a gain for a video signal output from the imaging unit, based on adjustment information relating to insertion/removal of the infrared cut filter to/from an optical path of the imaging optical system; and a transmitting unit configured to transmit insertion/removal specification information necessary for causing the user interface unit to specify the adjustment information, to the client device through the network. The insertion/removal specification information indicates whether different pieces of the adjustment information, which is used by the control unit, can be individually specified, or the adjustment information can be commonly specified, for a case in which the infrared cut filter is inserted to the optical path and a case in which the infrared cut filter is removed from the optical path.

Advantageous Effects of Invention

The invention can provide the client device that is connected to the imaging device through the network, recognizes the case in which the imaging device uses the additional information relating to insertion/removal of the infrared cut filter, and hence increases the operability of the user.

Also, the invention can provide the following imaging apparatus. That is, the invention can provide the imaging device that is connected to the client device through the network, causes the client device to recognize the case in which the imaging device uses the additional information relating to insertion/removal of the infrared cut filter, and hence increases the operability of the user.

Also, the invention can provide the following imaging system. That is, the invention can provide the imaging system that causes the client device, which is connected to the imaging device through the network, to recognize the case in which the imaging device uses the additional information relating to insertion/removal of the infrared cut filter, and hence increases the operability of the user.

Also, with the invention, the imaging device can be controlled to automatically perform insertion/removal of the infrared cut filter, from the external client device through the network.

Also, with the invention, necessity of setting with regard to the brightness level of the external environment and the delay time relating to insertion/removal of the infrared cut filter as the additional information is reduced, and hence the operability of the user can be increased.

BRIEF DESCRIPTION OF DRAWINGS

FIG. 1 is a block diagram showing a configuration of an imaging device according to an embodiment of the invention.

FIG. 2A shows a data structure used for a command received by the imaging device according to the embodiment of the invention.

FIG. 2B shows a data structure used for a command received by the imaging device according to the embodiment of the invention.

FIG. 2C shows a data structure used for a command received by the imaging device according to the embodiment of the invention.

FIG. 2D shows a data structure used for a command received by the imaging device according to the embodiment of the invention.

FIG. 2E shows a data structure used for a command received by the imaging device according to the embodiment of the invention.

FIG. 3A shows a configuration example for a command received by the imaging device according to the embodiment of the invention.

FIG. 3B shows a configuration example for a command received by the imaging device according to the embodiment of the invention.

FIG. 3C shows a configuration example for a command received by the imaging device according to the embodiment of the invention.

FIG. 3D shows a configuration example for a command received by the imaging device according to the embodiment of the invention.

FIG. 3E shows a configuration example for a command received by the imaging device according to the embodiment of the invention.

FIG. 3F shows a configuration example for a command received by the imaging device according to the embodiment of the invention.

FIG. 4 is a transition chart showing a brightness over time indicative of an operation example of the imaging device according to the embodiment of the invention.

FIG. 5 is a message sequence chart between the imaging device and a client device according to the embodiment of the invention.

FIG. 6A shows a configuration example for a graphical user interface (GUI) of an external client according to the embodiment of the invention.

FIG. 6B shows a configuration example for a GUI of an external client according to the embodiment of the invention.

FIG. 7 is a block diagram showing a configuration of the client device according to the embodiment of the invention.

FIG. 9A shows a detailed configuration example for a command received by the imaging device according to the embodiment of the invention.

FIG. 9B shows a detailed configuration example for a command received by the imaging device according to the embodiment of the invention.

FIG. 9C shows a detailed configuration example for a command received by the imaging device according to the embodiment of the invention.

FIG. 9D shows a detailed configuration example for a command received by the imaging device according to the embodiment of the invention.

FIG. 9E shows a detailed configuration example for a command received by the imaging device according to the embodiment of the invention.

FIG. 9F shows a detailed configuration example for a command received by the imaging device according to the embodiment of the invention.

FIG. 9G shows a detailed configuration example for a command received by the imaging device according to the embodiment of the invention.

FIG. 10A shows a detailed configuration example of a command received by the imaging device and a detailed configuration example of a response transmitted by the imaging device according to the embodiment of the invention.

FIG. 10B shows a detailed configuration example of a command received by the imaging device and a detailed configuration example of a response transmitted by the imaging device according to the embodiment of the invention.

FIG. 10C shows a detailed configuration example of a command received by the imaging device and a detailed configuration example of a response transmitted by the imaging device according to the embodiment of the invention.

FIG. 11 is a flowchart for explaining insertion/removal of an infrared cut filter by the imaging device according to the embodiment of the invention.

FIG. 12 is a flowchart for explaining automatic infrared-cut-filter setting GUI display processing by the external client according to the embodiment of the invention.

FIG. 13 is a flowchart for explaining SetImagingSettings command issuing processing by the external client according to the embodiment of the invention.

DESCRIPTION OF EMBODIMENT

Figure 8:
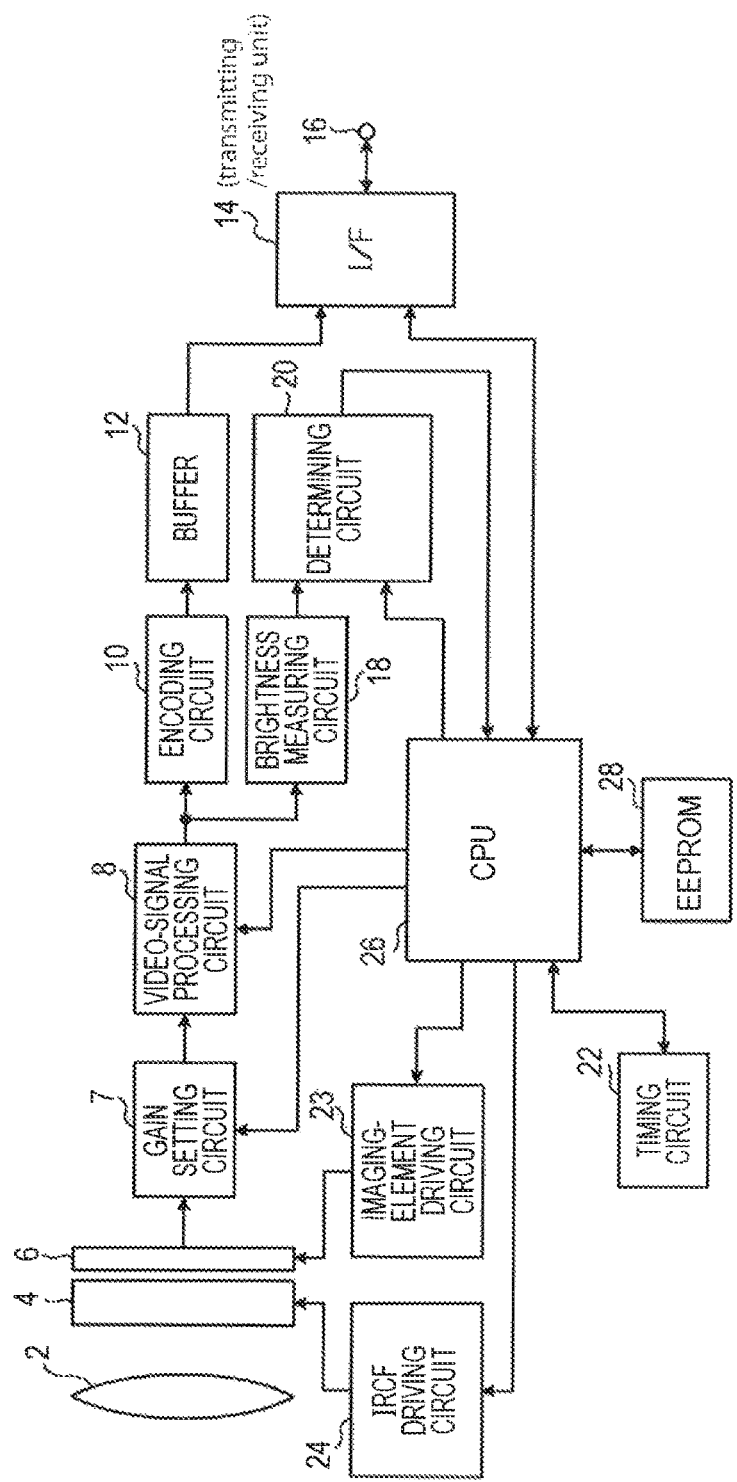
FIG. 8 is a block diagram showing a detailed configuration of the imaging device according to the embodiment of the invention.

An embodiment of the present invention will be described below with reference to the accompanying drawings. It is assumed that an imaging device according to this embodiment is a monitoring camera, and more specifically a network camera used for monitoring.

FIG. 1 is a block diagram showing a configuration of the imaging device according to this embodiment. In FIG. 1, reference sign 2 denotes an imaging optical system, 4 denotes an infrared cut filter (hereinafter, occasionally called IRCF), 6 denotes an imaging element, 8 denotes a video-signal processing circuit, 10 denotes an encoding circuit, and 12 denotes a buffer.

Also, reference sign 14 in FIG. 1 denotes a communication circuit (hereinafter, occasionally called I/F), 16 denotes a communication terminal, 18 denotes a brightness measuring circuit, 20 denotes a determining circuit, 22 denotes a timing circuit, and 24 denotes an infrared-cut-filter driving circuit (hereinafter, occasionally called IRCF driving circuit).

Further, reference sign 26 in FIG. 1 denotes a central processing circuit (hereinafter, occasionally called CPU). Reference sign 28 denotes an electrically erasable programmable read only memory (hereinafter, occasionally called EEPROM).

An operation will be described below with reference to FIG. 1. A light ray from an object, the image of which is taken, is incident on and photoelectrically converted by the imaging element 6 through the imaging optical system 2 and the IRCF 4. The IRCF 4 that cuts infrared radiation is inserted to and removed from an optical path between the imaging optical system 2 and the imaging element 6 by a driving mechanism (not shown) in accordance with a driving signal from the IRCF driving circuit 24.

The IRCF driving circuit 24 and the driving mechanism (not shown) in this embodiment correspond to an inserting/removing unit configured to insert/remove the IRCF 4 to/from the optical path of the imaging optical system 2.

In this embodiment, if the IRCF 4 is inserted to the optical path, normal imaging (visible-light imaging) is performed, and if the IRCF 4 is removed from the optical path, infrared imaging is performed. The imaging element 6 in this embodiment is formed of a charge-coupled device (CCD) or a complementary metal oxide semiconductor (CMOS). Also, the imaging element 6 in this embodiment corresponds to an imaging unit configured to take an image of an object formed by the imaging optical system 2 and output the image as a video signal.

Also, normal imaging (visible-light imaging) in this specification represents imaging with light from an object being incident on the imaging element 6 through the IRCF 4. Also, infrared imaging in this specification represents imaging with light from an object being incident on the imaging element 6 without the IRCF 4.

If infrared imaging is performed, the color balance of the video signal output from the imaging element 6 is degraded. Thus, it is assumed that the CPU 26 converts the video signal output from the imaging element 6 into a monochrome video signal, and causes the I/F 14 to transmit the signal. In this case, it is assumed that an imaging mode of the imaging device in this embodiment is called a monochrome mode.

Also, if normal imaging is performed, color reproducibility of the video signal output from the imaging element 6 is important. Thus, it is assumed that the CPU 26 converts the video signal output from the imaging element 6 into a color video signal, and causes the I/F 14 to transmit the signal. In this case, it is assumed that an imaging mode of the imaging device in this embodiment is called a color mode.

In this embodiment, if infrared imaging is performed, only a brightness signal is output from the video-signal processing circuit 8 to the encoding circuit 10 in response to an instruction of the CPU 26. The encoded brightness signal is output to the buffer 12, is packetized by the I/F 14, and is transmitted to an external client (not shown in FIG. 1) through the communication terminal 16.

In contrast, if normal imaging is performed, a brightness signal and a color-difference signal are output from the video-signal processing circuit 8 to the encoding circuit 10 in response to an instruction of the CPU 26. The encoded video signal is similarly transmitted to the outside through the buffer 12, the I/F 14, and the communication terminal 16. The communication terminal 16 in this embodiment is formed of, for example, a terminal (LAN terminal) to which a LAN cable is connected.

A setting command relating to insertion/removal of the IRCF 4 is transmitted from the external client to the I/F 14. The imaging device and the external client in this embodiment form an imaging system.

If the external client transmits an insertion instruction command for the IRCF 4 to the optical path, the command is processed with proper packet processing by the I/F 14, and is input to the CPU 26. The CPU 26 deciphers the insertion instruction command. The CPU 26 inserts the IRCF 4 to the optical path through the IRCF driving circuit 24.

The insertion instruction command is, for example, a SetImagingSettings command (described later) with the value of an IrCutFilter field set at On.

If the external client transmits an IRCF removal instruction from the optical path, the command is similarly processed with proper packet processing by the I/F 14, and is input to the CPU 26. The CPU 26 deciphers the removal instruction command, and removes the IRCF 4 from the optical path through the IRCF driving circuit 24.

In this embodiment, the external client (not shown) can send a command for setting to allow the imaging device in this embodiment to determine removal of the IRCF 4 from the optical path. The command is called, for example, a command for Auto setting.

The command for Auto setting (Auto setting command) is, for example, a SetImagingSettings command (described later) with the value of the IrCutFilter field set at AUTO.

Also, in this embodiment, an operation parameter, which relates to insertion/removal of the IRCF and which may be omitted, can be added to an option field in the Auto setting command.

The parameter which may be omitted in this embodiment is, for example, a brightness threshold with which the imaging device in this embodiment determines whether the IRCF is inserted to the optical path or the IRCF is removed from the optical path, in accordance with a change in brightness of an object (object brightness).

The option field in the Auto setting command is, for example, an IrCutFilterAutoAdjustment field (described later). Also, (the parameter of) the brightness threshold is, for example, a value of a BoundaryOffset field (described later).

If the parameter is present in the option field in the Auto setting command, the CPU 26 in FIG. 1 sets the threshold in the determining circuit 20. The brightness measuring circuit 18 measures a current object brightness based on a brightness signal output from the video-signal processing circuit 8 and outputs the current object brightness to the determining circuit 20. Hence, the brightness measuring circuit 18 in this embodiment corresponds to a photometry unit configured to measure the object brightness.

For example, the CPU 26 in this embodiment may calculate a threshold by adding a brightness threshold parameter to a value of threshold information previously stored in the EEPROM 28 and set the calculated threshold in the determining circuit 20.

For example, the EEPROM 28 in this embodiment may store a plurality of pieces of threshold information and brightness threshold parameters respectively associated with the plurality of pieces of threshold information. Further, for example, the CPU 26 in this embodiment may read threshold information corresponding to a brightness threshold parameter from the EEPROM 28, and set a threshold indicated by the read threshold information in the determining circuit 20.

The determining circuit 20 compares the set brightness threshold with the current brightness value output from the brightness measuring circuit, and outputs the determination result to the CPU 26. If the determination result indicates that the current brightness value is higher than the threshold, the CPU 26 inserts the IRCF 4 to the optical path, and performs normal imaging. In contrast, if the determination result input to the CPU 26 indicates that the current brightness value is equal to or smaller than the threshold, the CPU 26 removes the IRCF 4 from the optical path and performs infrared imaging.

If the parameter of the object brightness threshold, which may be omitted, is not present in the option field in the Auto setting command, the imaging device in this embodiment determines the threshold based on previously stored threshold information. In this embodiment, the threshold is previously stored in, for example, the EEPROM 28. The CPU 26 reads the threshold from the EEPROM 28 and sets the threshold in the determining circuit 20.

Hence, the CPU 26 in this embodiment functions as a brightness-threshold-parameter determining unit configured to determine whether the brightness threshold parameter is present or not in the option field in the Auto setting command. To be more specific, the CPU 26 functions as an Adjustment field determining unit configured to determine whether or not a SetImagingSettings command (described later) includes an IrCutFilterAutoAdjustment field (described later).

In this embodiment, data such as the threshold information previously stored in the EEPROM 28 corresponds to control information. Also, in this embodiment, the threshold information previously stored in the EEPROM 28 corresponds to predetermined threshold information.

Also, other parameter, which may be omitted, in the Auto setting command may be, for example, a delay time by which an insertion/removal operation of the IRCF 4 is delayed. If the parameter is present in the option field in the Auto setting command, the CPU 26 sets the delay time parameter in the timing circuit 22. The delay time parameter is, for example, a ResponseTime field (described later).

The timing circuit 22 measures a time, and if a set delay time elapses, outputs a signal indicative of a time lapse to the CPU 26. The CPU 26 with the time lapse signal input inserts/removes the IRCF 4 through the IRCF driving circuit 24.

If the delay time parameter is not present in the option field in the Auto setting command, the imaging device in this embodiment determines the delay time based on previously stored delay time information.

In this embodiment, the delay time is previously stored in, for example, the EEPROM 28. The CPU 26 reads the delay time from the EEPROM 28 and sets the delay time in the determining circuit 20. Alternatively, if the delay time parameter is not present in the option field in the Auto setting command, the IRCF may be immediately inserted/removed, so that the delay time is not set.

Hence, the CPU 26 in this embodiment functions as a delay-time-parameter determining unit configured to determine whether a delay time parameter is present or not in the option field in the Auto setting command.

To be more specific, the CPU 26 functions as a ResponseTime field determining unit configured to determine whether or not an IrCutFilterAutoAdjustment field (described later) includes a ResponseTime field (described later).

A command for inserting/removing the IRCF 4 to/from the optical path in this embodiment is determined on the basis of, for example, the Open Network Video Interface Forum (hereinafter, occasionally called ONVIF) standard. With the ONVIF standard, for example, the command is defined by using the XML Schema Definition language (hereinafter, occasionally called XSD).

The imaging device in this embodiment operates as a network video transmitter (hereinafter, occasionally called NVT) of the ONVIF standard. That is, the imaging device in this embodiment can transmit and receive data according to the ONVIF specification.

FIGS. 2A to 2E are each a definition example of a data structure for defining the command according to the XSD. In FIG. 2A, data named IrCutFilterModes is defined in a data type of ImagingSettings 20. Data named IrCutFilterModes is data having an IrCutFilterMode type, and the data type is defined in FIG. 2B.

As shown in FIG. 2B, in this embodiment, the IrCutFilterMode type is a data type that can take any value of ON, OFF, and AUTO.

Also, FIG. 2C defines data named IrCutFilterAutoAdjustment of IrCutFilterAutoAdjustment type. In this embodiment, the IrCutFilterAutoAdjustment data is set in the option field if the IrCutFilterMode type has the value of AUTO. This data is, for example, defined in the data type of ImagingSettings 20.

FIG. 2D shows the content of the IrCutFilterAutoAdjustment type. The data type is defined as a complex type according to the complexType declaration of the XSD. Also, in the data type example, it is specified that elements appear in order defined by a sequence specifier.

In the IrCutFilterAutoAdjustment type, a BoundaryType, which is a first element, is data having an IrCutFilterAutoBoundaryType type (described later). The data BoundaryType has to appear at least by one in the IrCutFilterAutoAdjustment type.

The next element is a BoundaryOffset, and indicates that the data is a float single-precision floating-point data type defined in a Primitive Datatype of the XSD. The BoundaryOffset is the brightness threshold parameter. The data BoundaryOffset may be omitted by using a minOccurs specifier of the XSD.

Also, in this embodiment, for example, BoundaryOffset may be set at a value obtained by normalizing a range of brightness thresholds which can be set for the imaging device in this embodiment into a value in a predetermined range (for example, from 1.0 to −1.0).

Also, in this embodiment, for example, the BoundaryOffset of 0 (zero) indicates a default value, and the BoundaryOffset of −1.0 indicates the lowest brightness value. Also, the BoundaryOffset of 1.0 indicates the highest brightness value. The BoundaryOffset in this embodiment corresponds to brightness information relating to a brightness.

The third element is a ResponseTime, which is a duration time interval data type defined in the Primitive Datatype of the XSD. The data ResponseTime may be omitted by using the minOccurs specifier of the XSD. The data ResponseTime specifies the delay time parameter.

The BoundaryOffset and the ResponseTime in this embodiment correspond to additional information relating to insertion/removal of the IRCF 4 to/from the optical path of the imaging optical system 2.

FIG. 2E shows a definition example of the IrCutFilter-AutoBoundaryType type. The data type is defined as a simple type according to the simpleType declaration of the XSD. Also, the data type is defined as a character string type, the value of which is restricted by a restriction specifier. The IrCutFilterAutoBoundaryType type is, as shown in FIG. 2E, a character string type that can take any value of Common, ToOff, ToOn, and Extended.

As described above, in this embodiment, a parameter of an option can be added to the Auto setting command for controlling insertion/removal of the IRCF. For example, the following options may be provided.

Option 1: a brightness threshold for removal of the IRCF if the object brightness is changed from a high brightness to a low brightness Option 2: a delay time from when the object brightness becomes smaller than the brightness threshold of the option 1 to when the operation for actually removing the IRCF is completed while the object brightness is changed from a high brightness to a low brightness Option 3: a brightness threshold for insertion of the IRCF if the object brightness is changed from a low brightness to a high brightness Option 4: a delay time from when the object brightness becomes larger than the brightness threshold of the option 3 to when the operation for actually inserting the IRCF is completed while the object brightness is changed from a low brightness to a high brightness In this embodiment, with the data definition using the XSD, the option 1 to the option 4 can be expressed in the Auto setting command. According to the ONVIF standard, the Auto setting command is issued as, for example, a SetImagingSettings command.

FIGS. 3A to 3F each show a configuration example of the SetImagingSettings command. FIG. 3A shows a configuration of the SetImagingSettings command including the option field. In FIG. 3A, since the value of the IrCutFilter field is AUTO, it is instructed that the imaging device automatically controls insertion/removal of the IRCF.

In this embodiment, the SetImagingSettings command with the value of the IrCutFilter field set at AUTO corresponds to an automatic insertion/removal control instruction for causing the imaging device to automatically control insertion/removal of the IRCF 4 by the IRCF driving circuit 24.

In this embodiment, if the value of the IrCutFilter field is AUTO, an IrCutFilterAutoAdjustment field may be described thereafter. As described above, the IrCutFilterAutoAdjustment field may be omitted.

As described above, the BoundaryType field, the BoundaryOffset field, and the ResponseTime field are described in the IrCutFilterAutoAdjustment field. Also, as described above, the BoundaryOffset field and the ResponseTime field may be omitted.

The BoundaryType field can specify which one of insertion and removal of the IRCF allows an operation specified by the IrCutFilterAutoAdjustment field to be effective. If the value of the BoundaryType field is ToOn, the operation becomes effective when the IRCF is inserted. If the value of the BoundaryType field is ToOff, the operation becomes effective when the IRCF is removed.

Further, if the value of the BoundaryType field is Common, the operation becomes effective in both the cases of insertion and removal. Also, as described above, the brightness threshold is set in accordance with the value of the BoundaryOffset, and the delay time is set in accordance with the ResponseTime field.

Hence, the BoundaryType field according to this embodiment corresponds to operation information indicative of the case in which the imaging device uses the BoundaryOffset field and the ResponseTime field received by the I/F 14. The operation information indicates one of the case in which the IRCF 4 is inserted to the optical path of the imaging optical system 2, the case in which the IRCF 4 is removed from the optical path of the imaging optical system 2, and both the case of insertion and the case of removal.

FIG. 3B shows a configuration of the SetImagingSettings command if the BoundaryType field is ToOn. In this case, the value of the BoundaryOffset and the value of the ResponseTime in the IrCutFilterAutoAdjustment field become effective when the IRCF is inserted. Also, as described above, the brightness threshold is set in accordance with the value of the BoundaryOffset, and the delay time is set in accordance with the ResponseTime field.

FIG. 3C shows a configuration of the SetImagingSettings command if the BoundaryType field is Common. In this case, the value of the BoundaryOffset and the value of the ResponseTime become effective in both the cases in which the IRCF is inserted and removed. Also, as described above, the brightness threshold is set in accordance with the value of the BoundaryOffset, and the delay time is set in accordance with the ResponseTime field.

FIG. 3D shows a configuration of the SetImagingSettings command if the IrCutFilterAutoAdjustment field is omitted. The imaging device in this embodiment determines all control for insertion/removal of the IRCF if the imaging device receives a SetImagingSettings command as follows. The command is the SetImagingSettings command that automatically sets the IRCF with the IrCutFilterAutoAdjustment field omitted.

FIG. 3E shows a configuration of the SetImagingSettings command if the value of the IrCutFilter field is ON. FIG. 3F shows a configuration of the SetImagingSettings command if the value of the IrCutFilter field is OFF. In this embodiment, in the cases of FIG. 3E and FIG. 3F, the IrCutFilterAutoAdjustment field is not set.

Then, an operation if the brightness threshold and delay time parameters are set according to this embodiment is described with reference to FIG. 4.

In FIG. 4, reference sign 101 denotes a graph showing a change in object brightness over time, 102 denotes a brightness threshold for insertion of the IRCF 4, and 103 denotes a brightness threshold for removal of the IRCF 4. FIG. 4 shows a case in which the object brightness decreases over time such as in a period of time around sunset.

As described above, the value of the brightness threshold is expressed by normalizing the brightness threshold, which can be set for the imaging device in this embodiment, to a value from −1.0 to 1.0. Hence, as shown in FIG. 4, the brightness threshold is a value in the range from −1.0 to 1.0.

As shown in FIG. 4, if the object brightness decreases and becomes smaller than the brightness threshold 103 for removal of the IRCF 4, the CPU 26 sets a delay time in the timing circuit 22, and starts a time measuring operation. In FIG. 4, the object brightness becomes smaller than the brightness threshold 103 at a point A. At this time, the time is t1. In this embodiment, the CPU 26 does not remove the IRCF 4 until the delay time set in the timing circuit 22 elapses. With this operation, even when the object brightness frequently intersects with the brightness threshold 103, imaging is not frequently switched between normal imaging and infrared imaging. Then, if the delay time elapses and reaches a time t2, the CPU 26 removes the IRCF 4 and shifts imaging to infrared imaging. The object brightness value at this time can increase the possibility of being stably smaller than the brightness threshold 103 like a point B for example. The operation is similarly performed even if an effect of flicker appears due to illumination with a fluorescent lamp or the like.

With this operation, in this embodiment, the user can make detailed setting relating to insertion/removal of the IRCF 4. Also, with this operation, in this embodiment, even if the brightness level of the imaged object is around the threshold, the IRCF 4 is prevented from being frequently inserted/removed. Also, with this operation, in this embodiment, even if the brightness value of the imaged object is changed due to flicker of illumination, the IRCF 4 is prevented from being frequently inserted/removed.

As described above, the value of the brightness threshold is typically set from the external client by normalizing the brightness threshold, which can be set for the imaging device in this embodiment, to a value from −1.0 to 1.0. However, a numeral outside the above-described range may be set because of a defect of the external client. To address this case, for example, if a numeral outside the above-described range is set, the imaging device in this embodiment rounds the numeral and sets the numeral as the upper limit value or the lower limit value which can be set.

If a value smaller than −1.0, for example, −2.5 is received as the value of the BoundaryOffset, the imaging device in this embodiment uses the BoundaryOffset value as −1.0. Also, if a value larger than 1.0, for example, 3.1 is received as the value of the BoundaryOffset, the imaging device in this embodiment uses the BoundaryOffset value as 1.0.

In the embodiment, if a value outside the setting allowable range is set as the value of the BoundaryOffset, the value is rounded as the upper limit value or the lower limit value which can be set. However, it is not limited thereto.

For example, an error may be returned to the SetImagingSettings command received from the external client. In this case, a SetImagingSettingsResponse returned from the imaging device in this embodiment has described therein a response code indicative of the BoundaryOffset value being incorrect. Then the SetImagingSettingsResponse is transmitted.

Hence, in this embodiment, the SetImagingSettingsResponse having described therein the response code indicative of the BoundaryOffset value being incorrect corresponds to error information. The error information is a response to the SetImagingSettings command with the value of the IrCutFilter field set at Auto.

Next, a transmission/reception operation (command transaction) for typical commands and responses in this embodiment is described with reference to FIG. 5. In FIG. 5, the command transaction is described by using a message sequence chart defined by the ITU-T Recommendation Z.120 standard. It is assumed that a client in FIG. 5 can be connected to the imaging device through a network.

First, the client in FIG. 5 is connected to the imaging device in this embodiment through the network. The client operates to check the presence of the above-described command (SetImagingSettings command) for setting the IRCF. The client transmits a GetServices command to the imaging device, and checks the presence of an Imaging Service. In FIG. 5, a GetServicesResponse indicates that the imaging device supports the Imaging Service. Then, the client transmits a GetVideoSources command to check a token indicative of a Video Source allowable for setting of the IRCF. In FIG. 5, the imaging device in this embodiment returns the token with a GetVideoSourcesResponse.

Then, the client transmits a GetOptions command including the token indicative of the Video Source to an address indicative of the Imaging Service of the imaging device. This is to check the presence of a command for setting the IRCF and an option relating to the command for setting the IRCF. As shown in FIG. 5, the imaging device in this embodiment returns a GetOptionsResponse including the IrCutFilter field and its option to the client.

In this embodiment, the GetOptions command and the GetOptionsResponse provide an acquisition function of acquiring a BoundaryType field corresponding to the above-described operation information, from the imaging device.

Then, the client transmits a GetImagingSettings command including the token indicative of the VideoSource to the address indicative of the Imaging Service of the imaging device, to make a query for a current state of the IRCF.

As shown in FIG. 5, the imaging device in this embodiment returns the following GetImagingSettingsResponse in response to the GetImagingSettings command. The response is a GetImagingSettingsResponse with the current state of the IRCF included in the IrCutFilter field and the IrCutFilterAutoAdjustment field. With this response, the client detects the current state of the imaging device. In this embodiment shown in FIG. 5, the IRCF 4 is being inserted to the optical path.

Hence, the GetImagingSettingsResponse in this embodiment corresponds to insertion/removal state information indicative of whether the IRCF 4 is inserted to the optical path of the imaging optical system 2 or the IRCF 4 is removed from the optical path of the imaging optical system 2.

Then, to allow the setting of the IRCF to be automatically controlled, the client transmits a SetImagingSettings command including the token indicative of the Video Source to the address indicative of the Imaging Service of the imaging device. In the example shown in FIG. 5, the client sets the value of AUTO in the IrCutFilter field, also sets the IrCutFilterAutoAdjustment field, and transmits the SetImagingSettings command. In FIG. 5, the imaging device in this embodiment returns a SetImagingSettingsResponse, in which an argument is omitted, to the client to indicate that the SetImagingSettings command is successfully executed.

As described above, in the IrCutFilterAutoAdjustment field in the SetImagingSettings command, the brightness threshold can be set in the BoundaryOffset field, and the delay time can be set in the ResponseTime field. Also, the BoundaryOffset field and the ResponseTime field may be omitted. Also, in the SetImagingSettings command of this embodiment, the IrCutFilterAutoAdjustment field can be also omitted.

In FIG. 5, since the SetImagingSettings command is successfully executed, Auto setting is provided in which the insertion/removal control of the IRCF is determined by the imaging device.

As described above, in this embodiment, the IrCutFilterAutoAdjustment field can be omitted for the SetImagingSettings command. Accordingly, the user can cause the control of the IRCF to be the Auto setting, and hence operability of the user can be increased.

The imaging device in this embodiment allows the setting of the IRCF regardless of the current state of the IRCF. Hence, in FIG. 5, the command transaction of the GetImagingSettings command and the GetImagingSettingsResponse may be omitted.

Then, an operation of the external client according to this embodiment is described with reference to FIGS. 6A and 6B. FIGS. 6A and 6B each show a configuration example of an automatic infrared-cut-filter setting GUI of the external client according to this embodiment.

In FIGS. 6A and 6B, reference sign 301 denotes an automatic infrared-cut-filter type selection pane, 303 denotes a Common selection check box, 305 denotes a ToOn selection check box, and 307 denotes a ToOff selection check box. Also, reference sign 309 denotes a BoundaryOffset setting numeral box, 311 denotes a delay-time setting numeral box, 315 denotes an automatic infrared-cut-filter setting pane, and 317 denotes a first brightness-threshold setting scale.

Further, reference sign 319 denotes a second brightness-threshold setting scale, 321 denotes a first delay-time setting scale, 323 denotes a second delay-time setting scale, 325 denotes a setting button, and 327 denotes a cancel button. In FIGS. 6A and 6B, the same reference signs represent the same functions.

In the automatic infrared-cut-filter setting pane 315 in FIGS. 6A and 6B, the vertical axis represents the brightness value and the horizontal axis represents the time. Also, in the automatic infrared-cut-filter setting pane 315 in FIGS. 6A and 6B, the value on the horizontal axis (on the time axis) represents the brightness value of 0 (zero), the upper limit indicates the normalized brightness value of 1.0, and the lower limit indicates the normalized brightness value of −1.0. Also, in the automatic infrared-cut-filter setting pane 315 in FIGS. 6A and 6B, the left limit indicates the delay time of 0 (zero).

FIG. 6A shows a GUI configuration example of the external client if the brightness threshold and delay time parameters are used for both removal and insertion of the infrared cut filter. That is, FIG. 6A is a configuration example of a GUI used if Common is set in the BoundaryType field and the GetImagingSettings command is issued.

In FIG. 6A, the user checks the Common selection check box 303. In this case, the brightness threshold and delay time parameters are commonly used for both removal and insertion of the infrared cut filter. Hence, the second brightness-threshold setting scale 319 and the second delay-time setting scale 323 are grayed out so as not to be operated by the user. That is, the second brightness-threshold setting scale 319 and the second delay-time setting scale 323 cannot be set.

In FIG. 6A, a value of the BoundaryOffset desired by the user is set by sliding the first brightness-threshold setting scale 317 in the vertical direction. When the user operates the first brightness-threshold setting scale 317, the value in a portion corresponding to Common (Common corresponding portion) in the BoundaryOffset setting numeral box 309 is changed accordingly. Also, the user can directly input a value in the Common corresponding portion in the BoundaryOffset setting numeral box 309. If the user inputs a numeral in the Common corresponding portion numeral box in the BoundaryOffset setting numeral box 309, the first brightness-threshold setting scale 317 is moved in the vertical direction accordingly.

With the above-described operation, in this embodiment, the user can roughly recognize the value of the BoundaryOffset to be set, with reference to the position of the first brightness-threshold setting scale 317. Also, the user can correctly recognize the value of the BoundaryOffset to be set, with reference to the numeral indicated in the BoundaryOffset setting numeral box 309.

In FIG. 6A, if the first brightness-threshold setting scale 317 is arranged on the horizontal axis (on the Time axis) and the setting button 325 is pressed, the external client device omits the BoundaryOffset field and issues the GetImagingSettings command. Similarly, if 0 (zero) is input in the Common corresponding portion of the BoundaryOffset setting numeral box 309 and the setting button 325 is pressed, the GetImagingSettings command with the BoundaryOffset field omitted is issued.

In this embodiment, the user instructs omission of the BoundaryOffset field by arranging the first brightness-threshold setting scale 317 on the horizontal axis (on the Time axis); however, it is not limited thereto.

For example, another GUI component may be arranged on the external client of this embodiment, and then omission of the BoundaryOffset field may be instructed. To be specific, a check box for omission of the BoundaryOffset field may be arranged in the GUI, and omission of the BoundaryOffset field may be instructed if the user checks the check box.

Also, in FIG. 6A, a value of the ResponseTime desired by the user is set by sliding the first delay-time setting scale 321 in the horizontal direction. In FIG. 6A, if the user slides the first delay-time setting scale 321 in the horizontal direction, the time indicated in the Common corresponding portion in the delay-time setting numeral box 311 is changed. Also, if the user directly inputs a time in the Common corresponding portion in the delay-time setting numeral box 311, the first delay-time setting scale 321 is moved in the horizontal direction in accordance with the set value.

In FIG. 6A, if the first delay-time setting scale 321 is arranged at the left end of the automatic infrared-cut-filter setting pane 315 and the setting button 325 is pressed, the external client device in this embodiment issues a SetImagingSettings command as follows. The command is a SetImagingSettings command with the ResponseTime field omitted.

Similarly, if 0 (zero) is input in all numeral boxes in the Common corresponding portion of the delay-time setting numeral box 311 and the setting button 325 is pressed, the SetImagingSettings command is issued with the ResponseTime field omitted.

In this embodiment, omission of the ResponseTime field is instructed by arranging the first delay-time setting scale 321 at the left end of the automatic infrared-cut-filter setting pane 315; however, it is not limited thereto.

For example, another GUI component may be arranged on the external client of this embodiment, and then omission of the ResponseTime field may be instructed. To be specific, a check box for omission of the ResponseTime field may be arranged in the GUI, and omission of the ResponseTime field may be instructed if the user checks the check box.

FIG. 6B shows a GUI configuration example of the external client if different brightness threshold and delay time parameters are used for removal and insertion of the infrared cut filter. FIG. 6B is a configuration example of a GUI used if ToOn and ToOff are set in the BoundaryType field and the SetImagingSettings command is issued.

In FIG. 6B, the user checks the ToOn selection check box 305 and the ToOff selection check box 307. In this case, when the infrared cut filter is inserted, the brightness threshold parameter set by the first brightness-threshold setting scale 317 and the delay time parameter set in the first delay-time setting scale 321 are used. Also, when the infrared cut filter is removed, the brightness threshold parameter set by the second brightness-threshold setting scale 319 and the delay time parameter set in the second delay-time setting scale 323 are used.

As described above, in FIG. 6B, since the ToOn selection check box 305 and the ToOff selection check box 307 are checked, the following scales are effective. In particular, the effective scales are the first brightness-threshold setting scale 317, the second brightness-threshold setting scale 319, the first delay-time setting scale 321, and the second delay-time setting scale 323.

In the external client in this embodiment, if only the ToOn selection check box 305 is checked, the first brightness-threshold setting scale 317 and the first delay-time setting scale 321 are effective. In this case, the second brightness-threshold setting scale 319 and the second delay-time setting scale 323 are grayed out so as not to be selected by the user.

In the external client in this embodiment, if only the ToOff selection check box 307 is checked, the second brightness-threshold setting scale 319 and the second delay-time setting scale 323 are effective. In this case, the first brightness-threshold setting scale 317 and the first delay-time setting scale 321 are grayed out so as not to be selected by the user.

In the external client in this embodiment, the Common selection check box 303 cannot be simultaneously selected with the ToOn selection check box 305 and the ToOff selection check box 307.

For example, if the Common selection check box 303 is selected, the user cannot select the ToOn selection check box 305 and the ToOff selection check box 307. Also, if either or both of the ToOn selection check box 305 and the ToOff selection check box 307 are selected, the user cannot select the Common selection check box 303.

Also, the external client in this embodiment may update the GUI in accordance with the Response of a GetImagingSettings command. In this case, the external client transmits the GetImagingSettings command with the above-described VideoSourceToken to an imaging device as a setting subject, prior to display of the automatic infrared-cut-filter setting GUI.

As described above, the imaging device in this embodiment returns the GetImagingSettingsResponse for the GetImagingSettings command. The GetImagingSettingsResponse is a response in which the current state of the IRCF is included in the IrCutFilter field and the IrCutFilterAutoAdjustment field.

The IrCutFilterAutoAdjustment field has described therein a current BoundaryType value, a current BoundaryOffset value, and a current ResponseTime value of the imaging device in this embodiment. The external client in this embodiment determines the indication of the Common selection check box 303, the ToOn selection check box 305, and the ToOff selection check box 307 in accordance with the BoundaryType value. If the value of the BoundaryType is Common, the Common selection check box 303 is checked. If the BoundaryType includes ToOn, the ToOn selection check box 305 is checked. If the BoundaryType includes ToOff, the ToOff selection check box 307 is checked.

Also, the external client in this embodiment determines the indication positions of the following scales in accordance with the BoundaryOffset value and the ResponseTime value corresponding to the BoundaryType. In particular, the scales are the first brightness-threshold setting scale 317, the second brightness-threshold setting scale 319, the first delay-time setting scale 321, and the second delay-time setting scale 323.

Also, in the external client in this embodiment, if the user presses the cancel button 327, the automatic infrared-cut-filter setting operation is ended.

The imaging device in this embodiment transmits GetOptionsResponse including the IrCutFilter field and its option to the external client. The external client may be configured to automatically update the Common selection check box 303, the ToOn selection check box 305, and the ToOff selection check box 307 in accordance with the transmitted GetOptionsResponse.

For example, the external client device may be configured to display the GUI (user interface) shown in FIG. 6A if Common is included as the BoundaryType in the GetOptionsResponse received from the imaging device. The interface is a user interface in the state in which the Common selection check box 303 is checked.

Also, the external client device may be configured to display the user interface shown in FIG. 6B if ToOn and ToOff are included as the BoundaryType in the GetOptionsResponse received from the imaging device. The interface is a user interface in the case in which the ToOn selection check box 305 and the ToOff selection check box 307 are checked.

Next, a configuration of the client device according to this embodiment is described with reference to FIG. 7. FIG. 7 is a block diagram showing a configuration of the client device according to the embodiment of the invention. In FIG. 7, reference sign 408 denotes an input unit, 414 denotes a digital interface unit (hereinafter, occasionally called I/F), 416 denotes an interface terminal, 422 denotes a display unit, 426 denotes a central processing unit (hereinafter, occasionally called CPU), and 428 denotes a memory.

The client device shown in FIG. 7 is a general-purpose computer, or typically a personal computer (hereinafter, occasionally called PC). The input unit 408 uses a pointing device, such as a keyboard or a mouse. The display unit 422 uses, for example, a liquid crystal display device, a plasma display device, or a cathode-ray tube (hereinafter, occasionally called CRT) display device.

The above-described GUI shown in FIGS. 6A and 6B is displayed on the display unit 422. The user of the client device operates the GUI shown in FIGS. 6A and 6B through the input unit 408. The CPU 426 displays the GUI and executes software for detecting a user operation with the input unit 408. An intermediate result of calculation by the CPU 426 and a data value required to be referenced later are temporarily stored in the memory 428 and are referenced. In this embodiment, the operation of the above-described external client is provided by the above-described operation.

As described above, in this embodiment, the client device is configured to acquire the BoundaryType field indicative of the case in which the imaging device uses the BoundaryOffset field and the ResponseTime field, from the imaging device.

For example, when setting is made to cause the imaging device to automatically control insertion/removal of the IRCF 4 to/from the optical path of the imaging optical system 2, the additional information such as the brightness level of the external environment and the delay time relating to insertion/removal of the infrared cut filter may be set.

Here is expected an imaging device with additional information set from the external client device. The additional information is commonly used for both the case in which the infrared cut filter is inserted to the optical path of the imaging optical system and the case in which the infrared cut filter is removed from the optical path of the imaging optical system.

However, setting the additional information commonly used for both the cases may be insufficient depending on the environment where the imaging device is installed. Owing to this, there is expected an imaging device with different pieces of additional information individually set from the external client device. The additional information includes additional information used when the infrared cut filter is inserted to the optical path of the imaging optical system, and additional information used when the infrared cut filter is removed from the optical path of the imaging optical system.

However, with this expectation, the user who operates the external client device hardly understand how the additional information is used by the imaging device as the connection target, and operability of the client device is not good.

Therefore, in this embodiment, the client device is configured to acquire the BoundaryType field indicative of the case in which the imaging device uses the BoundaryOffset field and the ResponseTime field, from the imaging device. Hence, the client device can recognize the case in which the imaging device as the connection target of the client device uses the BoundaryOffset field and the ResponseTime field. Accordingly, the operability of the user can be increased.

In this embodiment, the imaging device is configured to insert the IRCF 4 to the optical path of the imaging optical system 2 if the imaging device receives the SetImagingSettings command with the value of the IrCutFilter filed set at ON; however, it is not limited thereto.

For example, the imaging device may be configured to recognize a gain for the video signal output from the imaging element 6 as a first gain if the imaging device receives the GetImagingSettings command with the value of the IrCutFilter field set at ON. Similarly, the imaging device may be configured to perform image processing so that the video signal output from the imaging element 6 has a first brightness level if the imaging device receives the GetImagingSettings command with the value of the IrCutFilter field set at ON.

Also, in this embodiment, the imaging device is configured to remove the IRCF 4 from the optical path of the imaging optical system 2 if the imaging device receives the SetImagingSettings command with the value of the IrCutFilter filed set at OFF; however, it is not limited thereto.

For example, the imaging device may be configured to recognize a gain for the video signal output from the imaging element 6 as a second gain if the imaging device receives the SetImagingSettings command with the value of the IrCutFilter field set at OFF. Herein, the second gain is smaller than the first gain.

Similarly, for example, the imaging device may be configured to perform image processing so that the video signal output from the imaging element 6 has a second brightness level if the imaging device receives the SetImagingSettings command with the value of the IrCutFilter field set at ON. Herein, the first brightness level is higher than the second brightness level.

Also, in this embodiment, the imaging device is configured to insert/remove the IRCF 4 to/from the optical path of the imaging optical system 2 if the imaging device receives the SetImagingSettings command with the value of the IrCutFilter filed set at AUTO. However, it is not limited thereto.

For example, the imaging device may be configured to automatically control the gain for the video signal output from the imaging element 6 if the imaging device receives the SetImagingSettings command with the value of the IrCutFilter field set at AUTO.

Similarly, for example, the imaging device may be configured to automatically control the image processing for increasing the brightness for the video signal output from the imaging element 6 if the imaging device receives the SetImagingSettings command with the value of the IrCutFilter field set at AUTO.

In this embodiment, the GUI, the input unit 408, and the display unit 422 shown in FIGS. 6A and 6B correspond to a user interface unit.

Also, in this embodiment, the Common selection check box 303, the ToOn selection check box 305, and the ToOff selection check box 307 correspond to a selection unit as follows. That is, the selection unit selects whether automatic adjustment information corresponding to the case in which the IRCF 4 is inserted to the optical path of the imaging optical system 2 and automatic adjustment information corresponding to the case in which the IRCF 4 is removed from the optical path of the imaging optical system 2 can be input, or automatic adjustment information corresponding to both the cases can be input.

Also, in this embodiment, the GetOptionsResponse shown in FIG. 5 includes data named IrCutFilterAutoAdjustmentOptions. The data named IrCutFilterAutoAdjustmentOptions is data of an IrCutFilterAutoAdjustmentOptions type.

The IrCutFilterAutoAdjustmentOptions type is defined as a complex type according to the complexType declaration of the XSD. Also, the IrCutFilterAutoAdjustmentOptions type is specified by a sequence specifier so that elements appear (are described) in the defined order.

For example, a first element of the IrCutFilterAutoAdjustmentOptions type is data named BoundaryType of the IrCutFilterAutoBoundaryType type.

Also, a second element of the IrCutFilterAutoAdjustmentOptions type is data named BoundaryOffset of a float single-precision floating-point data type. The range of values of the data is restricted.

Further, a third element of the IrCutFilterAutoAdjustmentOptions type is data named ResponseTime of a duration time interval data type defined by the Primitive Datatype of the XSD.

The second and third elements of the IrCutFilterAutoAdjustmentOptions type may be omitted when being specified by minOccurs specifiers of the XSD.

Further, the imaging device in this embodiment may be configured to operate as follows if the imaging device receives the GetOptions command including the Token indicative of the Video Source from the external client (not shown). The operation is returning (transmitting) the GetOptionsResponse including data named IrCutFilterAutoAdjustmentOptions to the external client (not shown).

Also, the imaging device in this embodiment may be configured to operate as follows if the imaging device receives the GetImagingSettings command including the token indicative of the Video Source from the external client (not shown). The operation is retuning (transmitting) the GetImagingSettingsResponse including data named IrCutFilterAutoAdjustmentOptions to the external client (not shown).

Also, in this embodiment, a value of the BoundaryType field of the SetImagingSettings command shown in FIG. 5 is described below.

For example, if the client device determines that the value of the BoundaryType field of the GetOptionsResponse shown in FIG. 5 is set at "Common," the client device performs processing as follows. That is, the client device transmits the SetImagingSettings command with the value of the BoundaryType field set at "Common" to the imaging device in this embodiment.

For example, if the client device determines that the value of the BoundaryType field of the GetOptionsResponse shown in FIG. 5 is set at "ToOn," the client device performs processing as follows. That is, the client device transmits the SetImagingSettings command with the value of the BoundaryType set at "ToOn" to the imaging device in this embodiment.

For example, if the client device determines that the value of the BoundaryType field of the GetOptionsResponse shown in FIG. 5 is set at "ToOff," the client device performs processing as follows. That is, the client device transmits the SetImagingSettings command with the value of the BoundaryType set at "ToOff" to the imaging device in this embodiment.

The BoundaryOffset and the ResponseTime in this embodiment correspond to automatic adjustment information.

Also, in this embodiment, the GUI shown in FIGS. 6A and 6B allows input of automatic adjustment information corresponding to the Common selection check box 303 if the Common selection check box 303 is checked (selected). In this case, the GUI shown in FIGS. 6A and 6B inhibits input of automatic adjustment information corresponding to the ToOn selection check box 305 and automatic adjustment information corresponding to the ToOff selection check box 307.

Also, in this embodiment, the GUI shown in FIGS. 6A and 6B allows input of automatic adjustment information corresponding to the ToOn selection check box 305 if the ToOn selection check box 305 is checked (selected). In this case, the GUI shown in FIGS. 6A and 6B inhibits input of automatic adjustment information corresponding to the Common selection check box 303. Also, in this case, automatic adjustment information corresponding to the ToOff selection check box 307 can be input or cannot be input.

Also, in this embodiment, the GUI shown in FIGS. 6A and 6B allows input of automatic adjustment information corresponding to the ToOff selection check box 307 if the ToOff selection check box 307 is checked (selected). In this case, the GUI shown in FIGS. 6A and 6B inhibits input of automatic adjustment information corresponding to the Common selection check box 303. Also, in this case, automatic adjustment information corresponding to the ToOn selection check box 305 can be input or cannot be input.

Also, the IrCutFilterAutoAdjustment field in this embodiment is, for example, an optional parameter for adjusting a switch timing of the infrared cut filter used only in the Auto mode.

Also, for example, the BoundaryType in this embodiment specifies at which boundary the parameters such as the BoundaryOffset and the ResponseTime are used. The boundary to be specified is, for example, a boundary for automatically switching the infrared cut filter. The value of BoundaryType "Common" represents that the parameters are used for the boundary when the infrared cut filter is automatically switched to be effective and the boundary when the infrared cut filter is automatically switched to be ineffective. Also, the values of BoundaryType "ToOn" and "ToOff" each represent that the parameters are used for one of the boundary when the infrared cut filter is automatically switched to be effective and the boundary when the infrared cut filter is automatically switched to be ineffective.

Also, the BoundaryOffset field in this embodiment adjusts boundary exposure levels for switching the infrared cut filter between effective (On) and ineffective (Off). The value of the BoundaryOffset field is, for example, a value normalized in a range from −1.0 to +1.0, and has no unit. Further, regarding the value of the BoundaryOffset field, 0 is an initial value, −1.0 is the lowest (darkest), and +1.0 is the highest (brightest).

Also, the ResponseTime field in this embodiment is, for example, a delay time for switching the infrared cut filter between effective (On) and ineffective (Off) after the boundary exposure levels are crossed.

Also, the client device in this embodiment operates as a Network Video Receiver (hereinafter, occasionally called NVR) of the ONVIF standard. That is, the client device in this embodiment can transmit and receive data according to the ONVIF specification.

Also, in this embodiment, the imaging device may be configured so that the video signal output from the imaging element 6 serves as a first gain instead of removal of the IRCF 4 to the optical path of the imaging optical system 2. Further, in this embodiment, the imaging device may be configured so that the video signal output from the imaging element 6 serves as a second gain instead of insertion of the IRCF 4 from the optical path of the imaging optical system 2. Herein, the second gain is smaller than the first gain.

Also, in this embodiment, the imaging device may be configured so that the video signal output from the imaging element 6 serves as a first gain in addition to removal of the IRCF 4 to the optical path of the imaging optical system 2. Further, in this embodiment, the imaging device may be configured so that the video signal output from the imaging element 6 serves as a second gain in addition to insertion of the IRCF 4 from the optical path of the imaging optical system 2.

Also, in this embodiment, the imaging device may be configured so that the video signal output from the imaging element 6 serves as a first brightness (level) instead of removal of the IRCF 4 to the optical path of the imaging optical system 2. Further, in this embodiment, the imaging device may be configured so that the video signal output from the imaging element 6 serves as a second brightness (level) instead of insertion of the IRCF 4 from the optical path of the imaging optical system 2. Herein, the first brightness is higher than the second brightness.

Also, in this embodiment, the imaging device may be configured so that the video signal output from the imaging element 6 serves as a first brightness (level) in addition to removal of the IRCF 4 to the optical path of the imaging optical system 2. Also, in this embodiment, the imaging device may be configured so that the video signal output from the imaging element 6 serves as a second brightness (level) in addition to insertion of the IRCF 4 from the optical path of the imaging optical system 2.

In this embodiment, for example, the client device may be configured to display the GUI shown in FIG. 6A on the display unit 422 if the client device receives the GetOptionsResponse with the value of the BoundaryType field being "Common" in FIG. 5. Also, in this embodiment, for example, the client device may be configured as follows. That is, in FIG. 5, the client device displays the GUI shown in FIG. 6B on the display unit 422 if the client device receives the GetOptionsResponse with the value of the BoundaryType field being "ToOn" or/and "ToOff" in FIG. 5.

In this embodiment, for example, the SetImagingSettings command may be transmitted in FIG. 5 if the setting button 325 is pressed while the GUI shown in FIG. 6A is displayed. Similarly, for example, the SetImagingSettings command may be transmitted in FIG. 5 if the setting button 325 is pressed while the GUI shown in FIG. 6B is displayed.

Also, a power unit such as a stepping motor may be added to the imaging device in this embodiment, and the added power unit may rotate the imaging optical system 2 in a pan direction or a tilt direction. Further, a dome cover formed in a hemispherical shape may be added to the imaging device in this embodiment. The dome cover is transparent and has the hemispherical shape. Further, the dome cover covers the imaging optical system 2.

The CPU 26 in this embodiment removes the IRCF 4 from the optical path of the imaging optical system 2 if the object brightness is lower than the brightness corresponding to the BoundaryOffset continuously for a time (period) corresponding to the ResponseTime. Also, the CPU 26 in this embodiment inserts the IRCF 4 to the optical path of the imaging optical system 2 if the object brightness is higher than the brightness corresponding to the BoundaryOffset continuously for a time (period) corresponding to the ResponseTime.

As described above, the operation information in this embodiment indicates one of the case in which the IRCF 4 is inserted to the optical path of the imaging optical system 2, the case in which the IRCF 4 is removed from the optical path of the imaging optical system 2, and both the case of insertion and the case of removal.

Next, the embodiment is described in detail below with reference to FIGS. 8 to 13. In the following description, the same reference signs are applied to the same elements corresponding to the above-described embodiment, and the description may be occasionally omitted.

In this specification, a value of a field represents a value corresponding to a tag. For example, a value of an IrCutFilterAutoAdjustment field represents a value corresponding to an <IrCutFilterAutoAdjustment> tag.

Also, for example, a value of a BoundaryType field represents a value corresponding to a <BoundaryType> tag. For example, a value of a ResponseTime field represents a value corresponding to a <ResponseTime> tag.

Further, it is assumed that the imaging device in this embodiment corresponds to Power Over Ethernet (registered trademark, PoE), and is fed with electric power through a LAN cable.

FIG. 8 is a block diagram showing a detailed configuration of the imaging device according to this embodiment. A gain setting circuit 7 in FIG. 8 sets a gain for a video signal output from the imaging element 6 in response to an instruction of the CPU 26. For example, the gain setting circuit 7 changes a color-signal gain used for a white balance in response to an instruction of the CPU 26.

The video-signal processing circuit 8 changes a dynamic range of the video signal output from the imaging element 6 in response to an instruction of the CPU 26.

The imaging-element driving circuit 23 drives the imaging element 6 in response to an instruction of the CPU 26. For example, the imaging-element driving circuit 23 drives a charge-storage time of the imaging element 6 in response to an instruction of the CPU 26.

The CPU 26 has an image processing function. For example, the CPU 26 provides image processing to increase the brightness of the video signal output from the imaging element 6.

Next, FIGS. 9A to 9G each show a detailed configuration example of the SetImagingSettings command. FIG. 9A shows a configuration of the SetImagingSettings command including the option field. In FIG. 9A, since the value of the IrCutFilter field is AUTO, it is instructed that the imaging device automatically controls insertion/removal of the IRCF.

Hence, in this embodiment, the SetImagingSettings command with the value of the IrCutFilter field being AUTO corresponds to an automatic insertion/removal control instruction. The automatic insertion/removal control instruction is an instruction for causing the imaging device in this embodiment to automatically control insertion/removal of the IRCF 4 by the IRCF driving circuit 24.

In this embodiment, if the value of the IrCutFilter field is AUTO, an IrCutFilterAutoAdjustment field may be described thereafter. As described above, the IrCutFilterAutoAdjustment field may be omitted.

As described above, the BoundaryType field, the BoundaryOffset field, and the ResponseTime field are described in the IrCutFilterAutoAdjustment field.

That is, as shown in FIG. 9A, a <BoundaryType> tag, a <BoundaryOffset> tag, and a <ResponseTime> tag can be described in that order in the SetImagingSettings command.

Further, as described above, the BoundaryOffset field and the ResponseTime field may be omitted.

Also, as described above, the BoundaryType field can specify which one of insertion and removal of the IRCF allows an operation specified by the IrCutFilterAutoAdjustment field to be effective.

If the value of the BoundaryType field is ToOn, the operation becomes effective when the IRCF is inserted. If the value of the BoundaryType field is ToOff, the operation becomes effective when the IRCF is removed.

Also, if the value of the BoundaryType field is Common, the operation becomes effective in both the cases of insertion and removal. Also, as described above, the brightness threshold is set in accordance with the value of the BoundaryOffset, and the delay time is set in accordance with the ResponseTime field.

Hence, the <BoundaryType> tag associated with ToOn as the value corresponds to insertion specification allowable information. The insertion specification allowable information can specify that the CPU 26 makes a determination as follows based on the value of the <BoundaryOffset> tag and the value of the <ResponseTime> tag associated with the <BoundaryType> tag. That is, the determination is whether or not the IRCF 4 is inserted to the optical path of the imaging optical system 2.

Also, in this embodiment, the <BoundaryType> tag associated with ToOff as the value corresponds to removal specification allowable information. The removal specification allowable information can specify that the CPU 26 makes a determination as follows based on the value of the <BoundaryOffset> tag and the value of the <ResponseTime> tag associated with the <BoundaryType> tag. That is, the determination is whether or not the IRCF 4 is removed from the optical path of the imaging optical system 2.

Also, in this embodiment, the <BoundaryType> tag associated with Common as the value corresponds to common specification allowable information. The common specification allowable information specifies that the CPU 26 uses the value of the <BoundaryOffset> tag and the value of the <ResponseTime> tag associated with the <BoundaryType> tag commonly for two determinations as follows. That is, the determination is whether or not the IRCF 4 is inserted to the optical path of the imaging optical system 2, and the determination is whether or not the IRCF 4 is removed from the optical path of the imaging optical system 2.

FIG. 9B shows a configuration of the SetImagingSettings command if the ResponseTime field is omitted. If the ResponseTime field is omitted, as described above, the imaging device in this embodiment determines an operation of the delay time parameter.

In this embodiment, the delay time is previously stored in, for example, the EEPROM 28. The CPU 26 reads the delay time from the EEPROM 28 and sets the delay time in the determining circuit 20. Also, in FIG. 9B, the value of ToOn is set at the value of the BoundaryType field so that the operation specified in the IrCutFilterAutoAdjustment field becomes effective when the IRCF is inserted.

FIG. 9C shows a configuration of the SetImagingSettings command if the BoundaryType field is Common. In this case, the value of the BoundaryOffset and the value of the ResponseTime become effective in both the cases in which the IRCF 4 is inserted and removed.

Also, as described above, the brightness threshold is set in accordance with the value of the BoundaryOffset, and the delay time is set in accordance with the ResponseTime field.

FIG. 9D shows a configuration of the SetImagingSettings command if the IrCutFilterAutoAdjustment field is omitted.

The imaging device in this embodiment determines all control for insertion/removal of the IRCF if the imaging device receives a SetImagingSettings command as follows. The command is the SetImagingSettings command that automatically sets the IRCF with the IrCutFilterAutoAdjustment field omitted.

FIG. 9E shows a configuration of the SetImagingSettings command if the value of the IrCutFilter field is ON. FIG. 9F shows a configuration of the SetImagingSettings command if value of the IrCutFilter field is OFF.

In this embodiment, in the cases of FIG. 9E and FIG. 9F, the IrCutFilterAutoAdjustment field is not set.

FIG. 9G shows a configuration of the SetImagingSettings command if the value corresponding to the IrCutFilter tag is AUTO.

The SetImagingSettings command includes a first IrCutFilterAutoAdjustment tag corresponding to the BoundaryType tag with "ToOn" set as the value. Further, the SetImagingSettings command includes a second IrCutFilterAutoAdjustment tag corresponding to the BoundaryType tag with "ToOff" set as the value.

Hence, the CPU 26 uses values respectively for the BoundaryOffset tag and the ResponseTime tag corresponding to the first IrCutFilterAutoAdjustment type tag for the determination whether the IRCF 4 is inserted or not.

Also, the CPU 26 uses values respectively for the BoundaryOffset tag and the ResponseTime tag corresponding to the second IrCutFilterAutoAdjustment type tag for the determination whether the IRCF 4 is removed or not.

Also, in the SetImagingSettings command, the <BoundaryType> tag associated with the value of ToOn and the <BoundaryType> tag associated with the value of ToOff can be described in that order. (In the SetImagingSettings command, the <BoundaryType> tag associated with the value of ToOn and the <BoundaryType> tag associated with the value of ToOff can be described in that order.)

Next, the GetOptions command and the GetOptionsResponse in FIG. 5 are described in detail below with reference to FIGS. 10A to 10C. FIG. 10A is a GetOptions command with the value corresponding to the VideoSourceToken tag being 0. FIGS. 10B and 10C each show an example of a GetOptionsResponse.

Now, the imaging device is expected, which can specify an IrCutFilterAutoAdjustment commonly for the case in which the IRCF 4 is inserted to the optical path of the imaging optical system 2 and the case in which the IRCF 4 is removed from the optical path of the imaging optical system 2. FIG. 10B is a GetOptionsResponse transmitted by the expected imaging device.

Also, the imaging device is expected, which can specify IrCutFilterAutoAdjustments individually for the case in which the IRCF 4 is inserted to the optical path of the imaging optical system 2 and the case in which the IRCF 4 is removed from the optical path of the imaging optical system 2. FIG. 10C is a GetOptionsResponse transmitted by the expected imaging device.

In FIG. 10B, an <ImagingOptions20> tag is associated with three <img20:IrCutFilterModes> tags. The three <Img20:IrCutFilterModes> tags are respectively associated with ON, OFF, and AUTO.

Hence, the imaging device expected in FIG. 10B can operate in accordance with the SetImagingSettings command with ON, OFF, and AUTO set as the values of the IrCutFilter field.

Also, in FIG. 10B, the <IrCutFilterAutoAdjustmentOptions> tag is associated with the following three tags. The three tags are an <img20:Mode> tag, an <img20:BoundaryOffset> tag, and an <img20:ResponseTime> tag.

Herein, the <img20:Mode> tag is associated with Common. Accordingly, the GetOptionsResponse shown in FIG. 10B represents as follows.

That is, information of the <IrCutFilterAutoAdjustment> tag used by the CPU 26 can be specified commonly for the case in which the IRCF 4 is inserted to the optical path of the imaging optical system 2 and the case in which the IRCF 4 is removed from the optical path of the imaging optical system 2.

Also, the <img20:BoundaryOffset> tag is associated with true. Hence, the imaging device expected in FIG. 10B can operate in accordance with the SetImagingSettings command with the value corresponding to the <BoundaryOffset> tag set.

Further, the <img20:ResponseTime> tag is associated with an <img20:Min> tag and an <img20:Max> tag. Accordingly, the imaging device expected in FIG. 10B can operate based on the SetImagingSettings command with a time in a range from 0 second to 30 minutes set as the value corresponding to the <ResponseTime>.

Also, in FIG. 10C, (similarly to FIG. 10B,) the <ImagingOptions20> tag is associated with three <img20:IrCutFilterModes> tags. The three <Img20:IrCutFilterModes> tags are respectively associated with ON, OFF, and AUTO.

Also, in FIG. 10C, the <IrCutFilterAutoAdjustmentOptions> tag is associated with the following four tags. The four tags are two <img20:Mode> tags, an <img20:BoundaryOffset> tag, and an <img20:ResponseTime> tag.

Herein, the two <img20:Mode> tags are respectively associated with ToOn and ToOff. Accordingly, the GetOptionsResponse shown in FIG. 10C represents as follows.

That is, information of the <IrCutFilterAutoAdjustment> tag used by the CPU 26 can be specified individually for the case in which the IRCF 4 is inserted to the optical path of the imaging optical system 2 and the case in which the IRCF 4 is removed from the optical path of the imaging optical system 2.

Also, the <img20:BoundaryOffset> tag is associated with true. Further, the <img20:ResponseTime> tag is associated with an <img20:Min> tag and an <img20:Max> tag.

As shown in FIGS. 10B and 10C, in this embodiment, information associated with the <img20:Mode> tag corresponds to insertion/removal specification information.

Next, insertion/removal control for the IRCF 4 by the imaging device in this embodiment is described with reference to FIG. 11. FIG. 11 is a flowchart for explaining insertion/removal control processing for the IRCF 4 by the imaging device in this embodiment.

Herein, it is assumed that the imaging device in this embodiment is the imaging device expected in FIG. 10C. Further, it is assumed that the imaging device receives the SetImagingSettings command shown in FIG. 9G. It is assumed that execution of the processing shown in FIG. 11 by the CPU 26 is started after reception of the SetImagingSettings command.

In step S1101, the CPU 26 determines whether or not the IRCF 4 is being inserted to the optical path of the imaging optical system 2.

Then, if the CPU 26 determines that the IRCF 4 is being inserted to the optical path of the imaging optical system 2, the CPU 26 advances the processing to step S1102. In contrast, if the CPU 26 determines that the IRCF 4 is not being inserted to the optical path of the imaging optical system 2, the CPU 26 advances the processing to step S1107.

In step S1102, the CPU 26 determines whether or not the object brightness is lower than a predetermined brightness threshold. To be specific, the CPU 26 causes the determining circuit 20 to make a determination based on the object brightness output from the brightness measuring circuit 18, and the value corresponding to the <BoundaryOffset> tag associated with the <BoundaryType> tag with the value set at ToOn.

For example, the CPU 26 reads threshold information corresponding to a value (0.16) of the <BoundaryOffset> tag associated with the <BoundaryType> tag with the value set at ToOn from the EEPROM 28. Then, the CPU 26 sets a brightness threshold indicated by the read threshold information in the determining circuit 20.

Then, the determining circuit 20 determines whether or not the object brightness output from the brightness measuring circuit 18 is lower than the brightness threshold set by the CPU 26.

If the determining circuit 20 determines that the object brightness output from the brightness measuring circuit 18 is lower than the brightness threshold set by the CPU 26, the CPU 26 advances the processing to step S1103. In contrast, if the determining circuit 20 determines that the object brightness output from the brightness measuring circuit 18 is not lower than the brightness threshold set by the CPU 26, the CPU 26 returns the processing to step S1101.

In step S1103, the CPU 26 instructs the timing circuit 22 to start measuring a time. To be specific, the CPU 26 sets a value (1 minute 30 seconds) corresponding to the <ResponseTime> tag associated with the <BoundaryType> tag with the value set at ToOn in the timing circuit 22 to start measuring the time.

Step S1104 is similar to step S1102, and hence the description is omitted.

In step S1105, the CPU 26 determines whether or not a predetermined time has elapsed since the measurement of the time is started in step S1103. To be specific, the CPU 26 determines whether or not a time lapse signal is input from the timing circuit 22.

Then, if the time lapse signal is input from the timing circuit 22, the CPU 26 determines that the predetermined time has elapsed since the measurement of the time is started in step S1103, and advances the processing to step S1106. In contrast, if the time lapse signal is not input from the timing circuit 22, the CPU 26 determines that the predetermined time has not elapsed since the measurement of the time is started in step S1103, and returns the processing to step S1104.

In step S1106, the CPU 26 instructs the IRCF driving circuit 24 to insert the IRCF 4 to the optical path of the imaging optical system 2. The IRCF driving circuit 24 in this embodiment corresponds to an inserting/removing unit configured to insert/remove the IRCF 4 to/from the optical path of the imaging optical system 2. Also, the CPU 26 in this embodiment corresponds to a control unit configured to automatically control the IRCF driving circuit 24.

In step S1107, the CPU 26 determines whether or not the object brightness is higher than a predetermined brightness threshold. To be specific, the CPU 26 causes the determining circuit 20 to make a determination based on the object brightness output from the brightness measuring circuit 18, and the value corresponding to the <BoundaryOffset> tag associated with the <BoundaryType> tag with the value set at ToOff.

For example, the CPU 26 reads threshold information corresponding to a value (−0.62) of the <BoundaryOffset> tag associated with the <BoundaryType> tag with the value set at ToOff from the EEPROM 28. Then, the CPU 26 sets a brightness threshold indicated by the read threshold information in the determining circuit 20.

Then, the determining circuit 20 determines whether or not the object brightness output from the brightness measuring circuit 18 is higher than the brightness threshold set by the CPU 26.

If the determining circuit 20 determines that the object brightness output from the brightness measuring circuit 18 is higher than the brightness threshold set by the CPU 26, the CPU 26 advances the processing to step S1108. In contrast, if the determining circuit 20 determines that the object brightness output from the brightness measuring circuit 18 is not higher than the brightness threshold set by the CPU 26, the CPU 26 returns the processing to step S1101.

In step S1108, the CPU 26 instructs the timing circuit 22 to start measuring a time.

To be specific, the CPU 26 sets a value (1 minute 10 seconds) corresponding to the <ResponseTime> tag associated with the <BoundaryType> tag with the value set at ToOff in the timing circuit 22 to start measuring the time.

Step S1109 is similar to step S1107, and hence the description is omitted.

Step S1110 is similar to step S1105, and hence the description is omitted.

In step S1111, the CPU 26 instructs the IRCF driving circuit 24 to remove the IRCF 4 from the optical path of the imaging optical system 2.

Next, a case in which the imaging device in this embodiment is the imaging device expected in FIG. 10B is described with reference to FIG. 11. In this case, it is assumed that the imaging device in this embodiment receives the SetImagingSettings command shown in FIG. 8C. In the following description relating to FIG. 11, only points different from the above description of FIG. 11 are described.

In step S1102, the CPU 26 determines whether or not the object brightness is lower than a predetermined brightness threshold. To be specific, the CPU 26 causes the determining circuit 20 to make a determination based on the object brightness output from the brightness measuring circuit 18, and the value corresponding to the <BoundaryOffset> tag associated with the <BoundaryType> tag with the value set at Common For example, the CPU 26 reads threshold information corresponding to a value (0.52) of the <BoundaryOffset> tag associated with the <BoundaryType> tag with the value set at Common from the EEPROM 28. Then, the CPU 26 sets a brightness threshold indicated by the read threshold information in the determining circuit 20.

Then, the determining circuit 20 determines whether or not the object brightness output from the brightness measuring circuit 18 is lower than the brightness threshold set by the CPU 26.

If the determining circuit 20 determines that the object brightness output from the brightness measuring circuit 18 is lower than the brightness threshold set by the CPU 26, the CPU 26 advances the processing to step S1103. In contrast, if the determining circuit 20 determines that the object brightness output from the brightness measuring circuit 18 is not lower than the brightness threshold set by the CPU 26, the CPU 26 returns the processing to step S1101.

In step S1103, the CPU 26 instructs the timing circuit 22 to start measuring a time. To be specific, the CPU 26 sets a value (1 minute 15 seconds) corresponding to the <ResponseTime> tag associated with the <BoundaryType> tag with the value set at Common in the timing circuit 22 to start measuring the time.

In step S1107, the CPU 26 determines whether or not the object brightness is higher than a predetermined brightness threshold. To be specific, the CPU 26 causes the determining circuit 20 to make a determination based on the object brightness output from the brightness measuring circuit 18, and the value corresponding to the <BoundaryOffset> tag associated with the <BoundaryType> tag with the value set at Common For example, the CPU 26 reads threshold information corresponding to a value (−0.52) of the <BoundaryOffset> tag associated with the <BoundaryType> tag with the value set at Common from the EEPROM 28. Then, the CPU 26 sets a brightness threshold indicated by the read threshold information in the determining circuit 20.

Then, the determining circuit 20 determines whether or not the object brightness output from the brightness measuring circuit 18 is higher than the brightness threshold set by the CPU 26.

If the determining circuit 20 determines that the object brightness output from the brightness measuring circuit 18 is higher than the brightness threshold set by the CPU 26, the CPU 26 advances the processing to step S1108. In contrast, if the determining circuit 20 determines that the object brightness output from the brightness measuring circuit 18 is not higher than the brightness threshold set by the CPU 26, the CPU 26 returns the processing to step S1101.

In step S1108, the CPU 26 instructs the timing circuit 22 to start measuring a time.

To be specific, the CPU 26 sets a value (1 minute 15 seconds) corresponding to the <ResponseTime> tag associated with the <BoundaryType> tag with the value set at Common in the timing circuit 22 to start measuring the time.

Next, automatic infrared-cut-filter setting GUI display processing by the external client in this embodiment is described with reference to FIG. 12. FIG. 12 is a flowchart for explaining the automatic infrared-cut-filter setting GUI display processing. It is assumed that execution of the processing shown in FIG. 12 is started after the input unit 408 inputs an instruction of the user to the CPU 426.

In step S1201, the CPU 426 instructs the I/F 414 to transmit a GetOptions command to the imaging device in this embodiment.

In step S1202, the CPU 426 determines whether or not the CPU 426 has received a GetOptionsResponse from the imaging device in this embodiment.

Then, if the CPU 426 determines that the CPU 426 has received the GetOptionsResponse from the imaging device in this embodiment, the CPU 426 advances the processing to step S1203. In contrast, if the CPU 426 determines that the CPU 426 has not received the GetOptionsResponse from the imaging device in this embodiment, the CPU 426 advances the processing to step S1202.

In step S1203, the CPU 426 determines whether the value corresponding to an <img20:Modes> tag of the GetOptionsResponse determined as received in step S1202 is Common, or ToOn and ToOff.

If the CPU 426 determines that the value corresponding to the <img20:Modes> tag of the GetOptionsResponse determined as received in step S1202 is ToOn and ToOff, the CPU 426 advances the processing to step S1214. Processing in step S1214 is described later.

In step S1204, the CPU 426 checks (selects) the Common selection check box 303 in the automatic infrared-cut-filter setting GUI.

In step S1205, the CPU 426 inhibits selection of the ToOn selection check box 305 and the ToOff selection check box 307 in the automatic infrared-cut-filter setting GUI.

In step S1206, the CPU 426 determines whether or not the value corresponding to an <img20:BoundaryOffset> tag of the GetOptionsResponse determined as received in step S1202 is true. Then, if the CPU 426 determines that the value corresponding to the <img20:BoundaryOffset> tag of the GetOptionsResponse determined as received in step S1202 is true, the CPU 426 advances the processing to step S1207.

In contrast, if the CPU 426 determines that the value corresponding to the <img20:BoundaryOffset> tag of the GetOptionsResponse determined as received in step S1202 is not true, the CPU 426 advances the processing to step S1212.

In step S1207, the CPU 426 allows setting of the first brightness-threshold setting scale 317 and the Common corresponding portion of the BoundaryOffset setting numeral box 309 in the automatic infrared-cut-filter setting GUI.

In step S1208, the CPU 426 inhibits setting of the first brightness-threshold setting scale 317 and the Common corresponding portion of the BoundaryOffset setting numeral box 309 in the automatic infrared-cut-filter setting GUI.

In step S1209, the CPU 426 inhibits setting of the second brightness-threshold setting scale 319 and the ToOn corresponding portion and the ToOff corresponding portion of the BoundaryOffset setting numeral box 309 in the automatic infrared-cut-filter setting GUI.

In step S1210, the CPU 426 determines whether or not the GetOptionsResponse determined as received in step S1202 includes an <img20:ResponseTime> tag. Then, if the CPU 426 determines that the GetOptionsResponse determined as received in step S1202 includes the <img20:ResponseTime> tag, the CPU 426 advances the processing to step S1211.

In contrast, if the CPU 426 determines that the GetOptionsResponse determined as received in step S1202 does not include the <img20:ResponseTime> tag, the CPU 426 advances the processing to step S1212.

In step S1211, the CPU 426 allows setting of the first delay-time setting scale 321 and the Common corresponding portion of the delay-time setting numeral box 311 in the automatic infrared-cut-filter setting GUI.

In step S1212, the CPU 426 inhibits setting of the first delay-time setting scale 321 and the Common corresponding portion of the delay-time setting numeral box 311 in the automatic infrared-cut-filter setting GUI.

In step S1213, the CPU 426 inhibits setting of the second delay-time setting scale 323 and the ToOn corresponding portion and the ToOff corresponding portion of the delay-time setting numeral box 311 in the automatic infrared-cut-filter setting GUI.

In step S1214, the CPU 426 inhibits selection of the Common selection check box 303 in the automatic infrared-cut-filter setting GUI.

In step S1215, the CPU 426 checks (selects) the ToOn selection check box 305 and the ToOff selection check box 307 in the automatic infrared-cut-filter setting GUI.

Step S1216 is similar to step S1206, and hence the description is omitted.

In step S1217, the CPU 426 allows setting of the first brightness-threshold setting scale 317 in the automatic infrared-cut-filter setting GUI. Further, the CPU 426 inhibits setting of the Common corresponding portion of the BoundaryOffset setting numeral box 309 in the automatic infrared-cut-filter setting GUI.

In step S1218, the CPU 426 allows setting of the second brightness-threshold setting scale 319 and the ToOn corresponding portion and the ToOff corresponding portion of the BoundaryOffset setting numeral box 309 in the automatic infrared-cut-filter setting GUI.

Step S1219 is similar to step S1208, and hence the description is omitted.

Step S1220 is similar to step S1209, and hence the description is omitted.

Step S1221 is similar to step S1210, and hence the description is omitted.

In step S1222, the CPU 426 allows setting of the first delay-time setting scale 321 and the ToOn corresponding portion and the ToOff corresponding portion of the delay-time setting numeral box 311 in the automatic infrared-cut-filter setting GUI.

In step S1223, the CPU 426 allows setting of the second delay-time setting scale 323 and the ToOn corresponding portion and the ToOff corresponding portion of the delay-time setting numeral box 311 in the automatic infrared-cut-filter setting GUI.

Step S1224 is similar to step S1212, and hence the description is omitted.

Step S1225 is similar to step S1213, and hence the description is omitted.

Next, SetImagingSettings issuing processing by the external client in this embodiment is described with reference to FIG. 13. FIG. 13 is a flowchart for explaining the SetImagingSettings issuing processing. It is assumed that execution of the processing shown in FIG. 13 is started after the input unit 408 inputs an instruction of a user to the CPU 426.

For example, the CPU 426 determines whether the setting button 325 in the automatic infrared-cut-filter setting GUI is pressed or not. If the CPU 426 determines that the setting button 325 is pressed, the CPU 426 starts processing shown in FIG. 13. If the CPU 426 determines that the setting button 325 is not pressed, the CPU 426 does not start processing shown in FIG. 13.

In step S1301, the CPU 426 generates a SetImagingSettings command as shown in FIG. 9D, and causes the memory 428 to store the generated SetImagingSettings command. Herein, the value corresponding to the <IrCutFilter> tag of the SetImagingSettings command is AUTO.

In step S1302, the CPU 426 determines whether the Common selection check box 303 is selected, or both the ToOn selection check box 305 and the ToOff selection check box 307 are selected.

If the CPU 426 determines that the Common selection check box 303 is selected, the CPU 426 advances the processing to step S1303. In contrast, if the CPU 426 determines that both the ToOn selection check box 305 and the ToOff selection check box 307 are selected, the CPU 426 advances the processing to step S1309.

In step S1303, the CPU 426 adds a description corresponding to a <BoundaryType> tag with the value set at Common, to the SetImagingSettings command stored in the memory 428 in step S1301.

Accordingly, an <IrCutFilterAutoAdjustment> tag of the SetImagingSettings command is associated with the <BoundaryType> tag with the value set at Common.

In step S1304, the CPU 426 determines whether or not a value is set in the Common corresponding portion in the BoundaryOffset setting numeral box 309. If the CPU 426 determines that a value is set in the Common corresponding portion in the BoundaryOffset setting numeral box 309, the CPU 426 advances the processing to step S1305.

In contrast, if the CPU 426 determines that a value is not set in the Common corresponding portion in the BoundaryOffset setting numeral box 309, the CPU 426 advances the processing to step S1306.

In step S1305, the CPU 426 adds a description as follows to the SetImagingSettings command stored in the memory 428 in step S1301.

The description is a description corresponding to the <BoundaryType> tag having set therewith the value determined as set in step S1304.

Accordingly, the <IrCutFilterAutoAdjustment> tag of the SetImagingSettings command is associated with the <BoundaryOffset> tag having set therewith the value determined as set in step S1304.

In step S1306, the CPU 426 determines whether or not a value is set in the Common corresponding portion in the delay-time setting numeral box 311. If the CPU 426 determines that a value is set in the Common corresponding portion in the delay-time setting numeral box 311, the CPU 426 advances the processing to step S1307.

In contrast, if the CPU 426 determines that a value is not set in the Common corresponding portion in the delay-time setting numeral box 311, the CPU 426 advances the processing to step S1308.

In step S1307, the CPU 426 adds a description as follows to the SetImagingSettings command stored in the memory 428 in step S1301. The description is a description corresponding to the <ResponseTime> tag having set therewith the value determined as set in step S1306.

Hence, the <IrCutFilterAutoAdjustment> tag of the SetImagingSettings command is associated with the following description. The description is a description corresponding to the <ResponseTime> tag having described therewith the value determined as set in step S1306.

In step S1308, the CPU 426 instructs the I/F 414 to transmit the SetImagingSettings command stored in the memory 428 in step S1301 to the imaging device in this embodiment.

In step S1309, the CPU 426 adds a description of first and second <IrCutFilterAutoAdjustment> tags as follows to the SetImagingSettings command stored in the memory 428 in step S1301.

The first <IrCutFilterAutoAdjustment> tag includes the <BoundaryType> tag with the value set at ToOn. Also, the <IrCutFilterAutoAdjustment> tag includes the <BoundaryType> tag with the value set at ToOff.

In step S1310, the CPU 426 determines whether or not a value is set in the ToOn corresponding portion in the BoundaryOffset setting numeral box 309. If the CPU 426 determines that a value is set in the ToOn corresponding portion in the BoundaryOffset setting numeral box 309, the CPU 426 advances the processing to step S1311.

In contrast, if the CPU 426 determines that a value is not set in the ToOn corresponding portion in the BoundaryOffset setting numeral box 309, the CPU 426 advances the processing to step S1312.

In step S1311, the CPU 426 adds a description to the first <IrCutFilterAutoAdjustment> tag included in the SetImagingSettings command stored in the memory 428 in step S1301. The description is a description corresponding to the <BoundaryOffset> tag having set therewith the value determined as set in step S1310.

Hence, the first <IrCutFilterAutoAdjustment> tag of the SetImagingSettings command is associated with the <BoundaryOffset> tag as follows. The tag is the <BoundaryOffset> tag determined as set in step S1310.

In step S1312, the CPU 426 determines whether or not a value is set in the ToOff corresponding portion in the BoundaryOffset setting numeral box 309. If the CPU 426 determines that a value is set in the ToOff corresponding portion in the BoundaryOffset setting numeral box 309, the CPU 426 advances the processing to step S1313.

In contrast, if the CPU 426 determines that a value is not set in the ToOff corresponding portion in the BoundaryOffset setting numeral box 309, the CPU 426 advances the processing to step S1314.

In step S1313, the CPU 426 adds a description as follows to the second <IrCutFilterAutoAdjustment> tag included in the SetImagingSettings command stored in the memory 428 in step S1301. The description is the <BoundaryOffset> tag having set therewith the value determined as set in step S1312.

In step S1314, the CPU 426 determines whether or not a value is set in the ToOn corresponding portion in the delay-time setting numeral box 311. If the CPU 426 determines that a value is set in the ToOn corresponding portion in the delay-time setting numeral box 311, the CPU 426 advances the processing to step S1315.

In contrast, if the CPU 426 determines that a value is not set at in ToOn corresponding portion in the delay-time setting numeral box 311, the CPU 426 advances the processing to step S1316.

In step S1315, the CPU 426 adds a description as follows to the first <IrCutFilterAutoAdjustment> tag included in the SetImagingSettings command stored in the memory 428 in step S1301. The description is the <ResponseTime> tag having set therewith the value determined as set in step S1314.

In step S1316, the CPU 426 determines whether or not a value is set in the ToOff corresponding portion in the delay-time setting numeral box 311. If the CPU 426 determines that a value is set in the ToOff corresponding portion in the delay-time setting numeral box 311, the CPU 426 advances the processing to step S1317.

In contrast, if the CPU 426 determines that a value is not set in the ToOff corresponding portion in the delay-time setting numeral box 311, the CPU 426 advances the processing to step S1308.

In step S1317, the CPU 426 adds a description as follows to the second <IrCutFilterAutoAdjustment> tag included in the SetImagingSettings command stored in the memory 428 in step S1301. The description is a description corresponding to the <ResponseTime> tag having described therewith the value determined as set in step S1316.

Hence, the first <IrCutFilterAutoAdjustment> tag of the SetImagingSettings command is associated with the <ResponseTime> tag as follows. The tag is a description corresponding to the <ResponseTime> tag having set therewith the value determined as set in step S1316.

The imaging device and the client device according to this embodiment save commands defined with the XSD in this embodiment in file format.

Also, it is assumed that an address indicative of an Imaging Service of the imaging device in this embodiment is equal to an address indicative of a Video Analytics Service of the imaging device and an address indicative of a pan tilt zoom (PTZ) Service of the imaging device. However, it is not limited thereto. For example, these addresses may differ from one another.

In this embodiment, it is assumed that the first IrCutFilterAutoAdjustment tag and the second IrCutFilterAutoAdjustment tag are described in the SetImagingSettings command in that order.

In the above-described embodiment, the IRCF 4 is used; however, it is not limited thereto. For example, an optical filter such as a neutral density (ND) filter may be used instead of the IRCF 4. The ND filter decreases the quantity of light from an object without affecting color development of a video signal output from the imaging element 6.

The invention may be realized by executing the following processing. The processing is supplying software (program) configured to realize the functions of the above-described embodiment to a system or a device through a network or any of various storage media, and reading and executing the program by using a computer (or CPU, microprocessing unit (MPU), etc.) of the system or the device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-012311 filed Jan. 25, 2013 and No. 2013-053595 filed Mar. 15, 2013, which are hereby incorporated by reference herein in their entirety.

REFERENCE SIGNS LIST 2 imaging optical system
4 infrared cut filter (IRCF)
6 imaging element
14 communication circuit
24 IRCF driving circuit

The invention claimed is:

1. A client device that communicates with an imaging device through a network, the imaging device including an inserting/removing unit configured to insert/remove an infrared cut filter to/from an optical path of the imaging device, and a control unit configured to control the inserting/removing unit based on adjustment information relating to insertion/removal of the infrared cut filter, the client device comprising:
    a hardware processor; and
    a memory for storing instructions to be executed by the hardware processor,
    wherein, when the instructions stored in the memory are executed by the hardware processor, the client device functions as:
    a receiving unit configured to receive insertion/removal information relating to the adjustment information from the imaging device through the network; and
    a user interface unit configured to allow a user to specify the adjustment information based on the insertion/removal information received by the receiving unit, wherein the insertion/removal information indicates whether different pieces of the adjustment information can be individually specified, or the adjustment information can be commonly specified, for a case in which the infrared cut filter is inserted to the optical path and a case in which the infrared cut filter is removed from the optical path, and wherein the user interface unit causes a display unit to display that different specification regions for individual specification can be specified if the different pieces of the adjustment information, which is used by the control unit, are individually specified, and the user interface unit causes the display unit to display that a common specification region for common specification can be specified if the adjustment information, which is used by the control unit, is commonly specified.

2. The client device according to claim 1, wherein the user interface unit causes the display unit to display that the common specification region cannot be specified if the user interface unit causes the display unit to display that the different specification regions can be specified, and the user interface unit causes the display unit to display that the different specification regions cannot be specified if the user interface unit causes the display unit to display that the common specification region can be specified.

3. The client device according to claim 1, further comprising a transmitting unit configured to transmit the adjustment information specified by the user interface unit to the imaging device through the network.

4. The client device according to claim 3, wherein the transmitting unit transmits an automatic insertion/removal control instruction for causing the imaging device to automatically control insertion/removal of the infrared cut filter by the inserting/removing unit, together with the adjustment information.

5. The client device according to claim 3, wherein the transmitting unit transmits the adjustment information after the receiving unit receives the insertion/removal specification information.

6. The client device according to claim 1, wherein the adjustment information includes a brightness of the object.

7. The client device according to claim 6, wherein a range of values of the brightness included in the adjustment information is restricted within a predetermined range.

8. The client device according to claim 1, wherein the adjustment information includes an elapsed time indicative of a time which has elapsed since a brightness of the object becomes lower than a predetermined threshold.

9. A control method of a client device that can make communication with an imaging device through a network, the imaging device including an imaging optical system, an imaging unit configured to take an image of an object formed by the imaging optical system, an infrared cut filter configured to cut infrared radiation, an inserting/removing unit configured to insert/remove the infrared cut filter to/from an optical path of the imaging optical system, and a control unit configured to control the inserting/removing unit based on adjustment information relating to insertion/removal of the infrared cut filter, the control method of the client device comprising:

a receiving step of receiving insertion/removal information relating to the adjustment information from the imaging device through the network, and a user interface step of allowing a user to specify the adjustment information based on the insertion/removal information received in the receiving step, wherein the insertion/removal information indicates whether different pieces of the adjustment information, which is used by the control unit, can be individually specified, or the adjustment information can be commonly specified, for a case in which the infrared cut filter is inserted to the optical path and a case in which the infrared cut filter is removed from the optical path, and wherein the user interface unit causes a display unit to display that different specification regions for individual specification can be specified if the different pieces of the adjustment information, which is used by the control unit, are individually specified, and the user interface unit causes the display unit to display that a common specification region for common specification can be specified if the adjustment information, which is used by the control unit, is commonly specified.

* * * * *